(12) United States Patent
Nikami et al.

(10) Patent No.: US 9,202,649 B2
(45) Date of Patent: Dec. 1, 2015

(54) OPERATION DEVICE

(71) Applicant: ALPS ELECTRIC CO., LTD., Tokyo (JP)

(72) Inventors: Fumihito Nikami, Miyagi-ken (JP); Satoru Inomata, Miyagi-ken (JP); Kenji Kawano, Miyagi-ken (JP); Kazunobu Onodera, Miyagi-ken (JP)

(73) Assignee: ALPS ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 14/521,146

(22) Filed: Oct. 22, 2014

(65) Prior Publication Data

US 2015/0144467 A1 May 28, 2015

(30) Foreign Application Priority Data

Nov. 27, 2013 (JP) .................................. 2013-244741
Sep. 18, 2014 (JP) .................................. 2014-190180

(51) Int. Cl.
*H01H 3/22* (2006.01)
*H01H 15/10* (2006.01)
*F16H 59/02* (2006.01)
*F16H 59/10* (2006.01)
*F16H 61/12* (2010.01)

(52) U.S. Cl.
CPC ............. *H01H 15/10* (2013.01); *F16H 59/02* (2013.01); *F16H 59/105* (2013.01); *F16H 61/12* (2013.01); *H01H 2205/002* (2013.01); *H01H 2300/02* (2013.01)

(58) Field of Classification Search
CPC  F16H 59/105; F16H 59/0204; F16H 59/0217

USPC ............... 74/335, 473.12, 473.18; 200/61.91
See application file for complete search history.

(56) References Cited

U.S. PATENT DOCUMENTS

| 3,628,642 | A | * | 12/1971 | Ravenel | ............... F16H 61/0211 192/222 |
| 5,090,269 | A | * | 2/1992 | Ohtsuka | ................ F16H 59/105 477/906 |
| 5,425,686 | A | * | 6/1995 | Grange | .................. B60K 20/06 477/79 |
| 5,847,344 | A | * | 12/1998 | Denyer | ................. F16H 59/105 200/61.88 |
| 6,012,352 | A | * | 1/2000 | Ishii | .................... F16H 59/0204 200/61.88 |
| 7,044,015 | B2 | | 5/2006 | Kusano | |

FOREIGN PATENT DOCUMENTS

JP         2005-48887         2/2005

* cited by examiner

*Primary Examiner* — Ha D Ho
(74) *Attorney, Agent, or Firm* — Beyer Law Group LLP

(57) ABSTRACT

An operation device includes three contact circuits each including fixed terminals and a slider as a movable contact for selectively changing a state between the fixed terminals to an ON/OFF state, a determination unit to which the contact circuits are connected, and an operation signal generation unit that outputs a signal indicating that an operation unit is in a state of ON operation. In response to an ON operation, the slider moves from an initial position where all contact circuits are in an OFF state to an end position where all contact circuits are turned on. Assuming that one of the contact circuits is a reference contact circuit and the others are output contact circuits, the reference contact circuit is provided such that a distance from the initial position to a position where the reference contact circuit is turned on is smaller than that for the output contact circuits.

10 Claims, 26 Drawing Sheets

FIG. 7

| | INITIAL POSITION P1 TO POSITION P2 | POSITION P2 TO END POSITION P3 | END POSITION P3 | FAILURE STATE | | |
|---|---|---|---|---|---|---|
| 20A | 0 | 1 | 1 | 0 | 0 | 0 |
| 20B | 0 | 1 | 1 | 0 | 1 | 1 |
| 20C | 0 | 0 | 1 | 1 | 0 | 1 |
| OUTPUT | OFF | OFF | ON | ON | OFF | OFF | ON |
| REMARK | | a | b | c | d | e | f |

FIG. 8

| | INITIAL POSITION P1 TO POSITION P2 | POSITION P2 TO END POSITION P3 | END POSITION P3 | FAILURE STATE |
|---|---|---|---|---|
| 20A | 0 | 1 | 1 | 0 |
| 20B | 0 | 0 | 1 | 1 |
| OUTPUT | OFF | OFF | ON | OFF |
| REMARK | | g | | h |

FIG. 10

| | INITIAL POSITION P1 TO POSITION P2 | POSITION P2a TO POSITION P2b | POSITION P2b TO END POSITION P3 | END POSITION P3 | FAILURE STATE | | |
|---|---|---|---|---|---|---|---|
| 20A | 0 | 1 | 1 | 1 | 0 | 0 | 0 |
| 20B | 0 | 0 | 1 | 1 | 1 | 0 | 1 |
| 20D | 0 | 0 | 0 | 1 | 1 | 1 | 0 |
| OUTPUT | OFF | OFF | ON | ON | ON | OFF | OFF |

FIG. 14

| | INITIAL POSITION P1 | INITIAL POSITION P1 TO END POSITION P3 | | | | | END POSITION P3 |
|---|---|---|---|---|---|---|---|
| 120B | 0 | 1 | 0 | 0 | 1 | 1 | 1 |
| 120C | 0 | 0 | 1 | 0 | 1 | 0 | 1 |
| 120D | 0 | 0 | 0 | 1 | 0 | 1 | 1 |
| OUTPUT | OFF | OFF | OFF | OFF | ON | ON | ON | ON |
| REMARK | | i | j | k | l | m | n | |

FIG. 15

|  | INITIAL POSITION P1 | INITIAL POSITION P1 TO END POSITION P3 | | END POSITION P3 |
|---|---|---|---|---|
| 120B | 0 | 1 | 0 | 1 |
| 120C | 0 | 0 | 1 | 1 |
| OUTPUT | OFF | OFF | OFF | ON |
| REMARK |  | ○ | p |  |

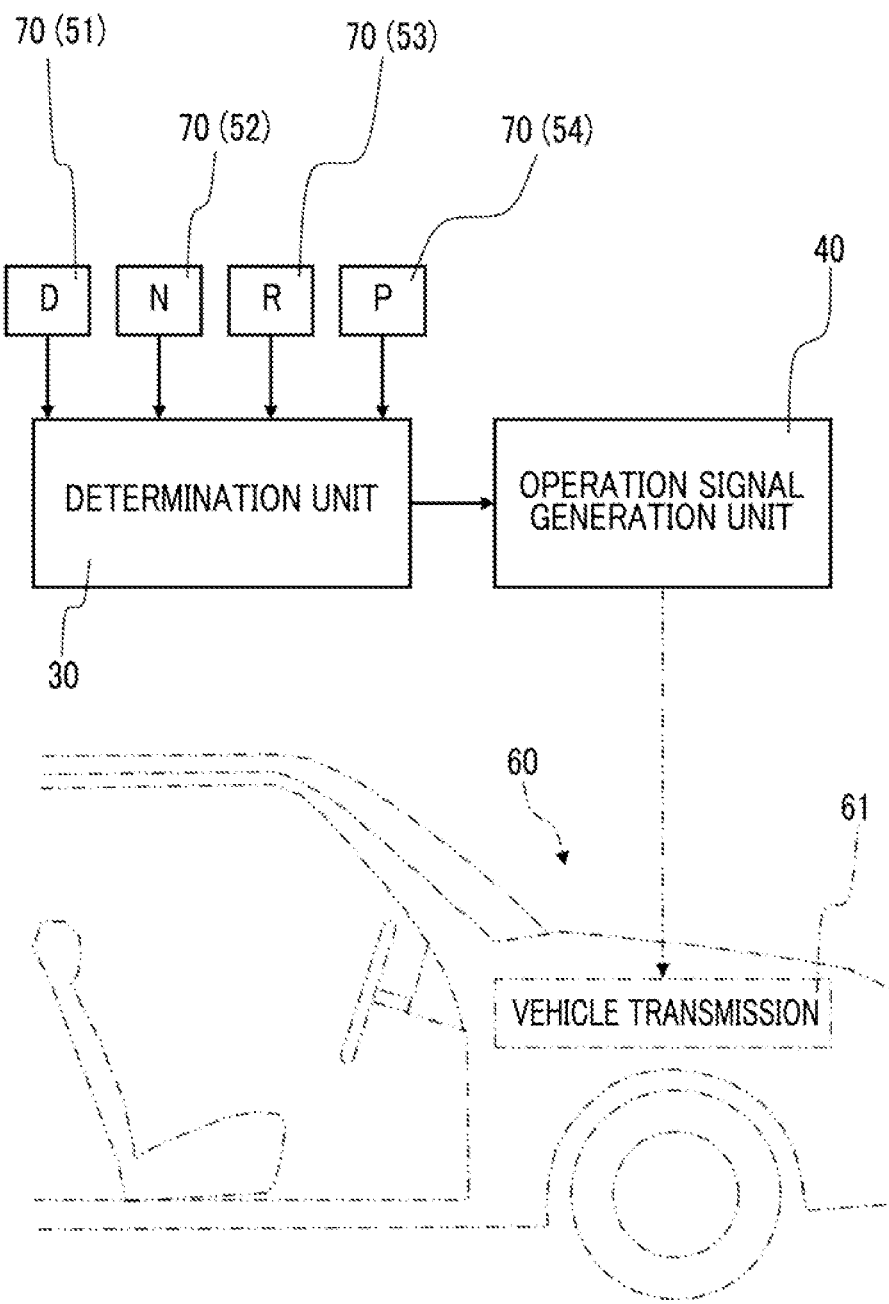

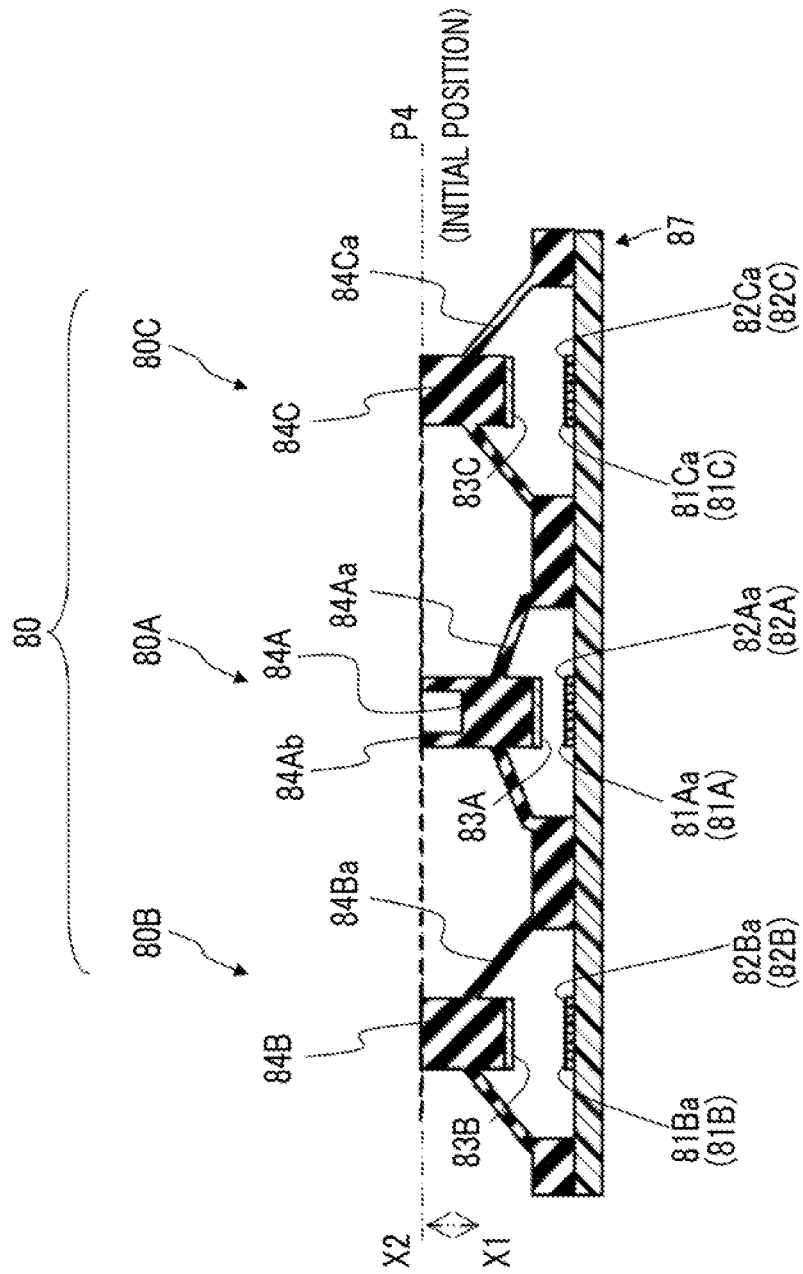

FIG. 24

| | INITIAL POSITION P4 TO POSITION P5 | POSITION P5 TO END POSITION P6 | | END POSITION P6 | FAILURE STATE | | |
|---|---|---|---|---|---|---|---|
| 80A | 0 | 1 | 1 | 1 | 0 | 0 | 0 |
| 80B | 0 | 0 | 1 | 1 | 0 | 1 | 1 |
| 80C | 0 | 0 | 1 | 1 | 1 | 0 | 1 |
| OUTPUT | OFF | OFF | ON | ON | OFF | OFF | ON |
| REMARK | | a | b | c | d | e | f |

FIG. 25

| | INITIAL POSITION P4 TO POSITION P5 | POSITION P4 TO END POSITION P6 | END POSITION P6 | FAILURE STATE |
|---|---|---|---|---|
| 80A | 0 | 1 | 1 | 0 |
| 80B | 0 | 0 | 1 | 1 |
| OUTPUT | OFF | OFF | ON | OFF |
| REMARK | | g | | h |

OPERATION DEVICE

CLAIM OF PRIORITY

This application claims benefit of Japanese Patent Application No. 2013-244741 filed on Nov. 27, 2013 and Japanese Patent Application No. 2014-0190180 filed on Sep. 18, 2014, which are hereby incorporated by reference.

BACKGROUND OF THE INVENTION

1. Field of the Invention

The present invention relates to an operation device that generates an operation signal by a switch input, and in particular, to an operation device that can increase safety by determining a failure more reliably.

2. Description of the Related Art

A switch input for ON/OFF of the contact of an electrical circuit is used in an operation device for controlling various apparatuses. For example, a switch input is used in an operation device for vehicles that is used to operate a vehicle transmission for driving control of the vehicle with an electrical operation signal.

Japanese Patent No. 3912344 discloses a control device 200 of an automatic transmission with a manual mode that allows manual mode switching or manual shift operation. FIG. 26 is a schematic diagram of the control device 200 disclosed in Japanese Patent No. 3912344.

As shown in FIG. 26, an automatic transmission 220 includes an automatic transmission mode and a manual mode, and changes the gear ratio according to the command of an electrical operation signal from a controller 201. The controller 201 is mainly configured by a microcomputer. The controller 201 reads signals from a mode change switch 203, an upshift switch 204, a downshift switch 205, and a selector switch 202 according to the operation of a shift lever 221 operated by the driver and determines a gear ratio based on the shift map set in advance, and transmits an instruction based on the determination to the automatic transmission 220. The mode change switch 203 for setting the manual mode, the upshift switch 204, and the downshift switch 205 are formed by a push switch including a normally open contact and a normally closed contact. By the operation of pressing the push switch, for example, a sliding portion having a movable contact moves to come into contact with or be separated from the fixed contact.

If the switches 203 to 205 are normal, only one output is necessarily turned on in response to each operation including non-operation. With the normally closed side of the downshift switch 205 as a monitor signal line 210, a signal is input to the controller 201. Accordingly, if other signals become ON when a monitor signal is ON, it can be determined that the contact has been fixed in any one of the switches 203 to 205. As a result, it is possible to detect an abnormality due to fixation. When inputs from all signal lines 207 to 210 become OFF, it can be determined that disconnection has occurred in any one of the switches 203 to 205 and the circuit.

If one of the signals is ON, it is determined that the switches 203 to 205 and the circuit are normal without disconnection and fixation, and normal control to perform a shift according to the operation is performed. On the other hand, when an abnormal pattern continues to exceed a predetermined value (predetermined time), it is determined that an abnormality has occurred in the switches 203 to 205 or the circuit.

In addition, although the specific configuration of the selector switch 202 is not disclosed in Japanese Patent No. 3912344, it is possible to use a shift lever position detecting switch (inhibitor switch) of the shift lever 221 operated by the driver. In addition, since the selector switch 202 serves to only transmit an electrical operation signal to the controller 201, a switch input can be applied instead of the shift lever 221.

However, in each switch input, there is a transient period in which a normally open contact and a normally closed contact are in an ON state or in an OFF state at the same time. In a switch structure where the movable contact is in contact with the fixed contact, there is rattling between the constituent members. Accordingly, in a half-pressed state of the push switch, there is a possibility that both contacts will be turned on or off. Therefore, in the control device 200 in the related art, it has been difficult to determine whether both the contacts are in an ON state or in an OFF state due to the transient period or the half-pressed state or both the contacts are in an ON state or in an OFF state due to the fixation of any one of the contacts. This problem is the same for a switch structure including two normally open contacts.

SUMMARY OF THE INVENTION

The present invention provides an operation device capable of generating an operation signal by switch input and determining a failure more reliably when the contact of one location fails.

According to an aspect of the present invention, there is provided an operation device including: an operation unit configured to perform an input operation and to include a plurality of contact circuits including a plurality of fixed terminals discretely arranged and movable contacts each of which selectively changes a state between the fixed terminals to an ON state or an OFF state; a determination unit to which the contact circuits are connected and configured to determine that the operation unit is in a state of ON operation or in a state of non-operation based on an ON state or an OFF state of each of the contact circuits; and an operation signal generation unit configured to output a signal indicating that the operation unit is in a state of the ON operation based on a determination result of the determination unit. When the operation unit is in a non-operation state, each movable contact is at an initial position where all of the plurality of contact circuits are in an OFF state. In response to an ON operation performed on the operation unit, the movable contacts move in conjunction with each other from the initial position to an end position where all of the plurality of contact circuits are turned on. Assuming that one of the plurality of contact circuits is a reference contact circuit and the others are output contact circuits, the reference contact circuit is provided such that a distance from the initial position where the movable contact starts to move to a position where the reference contact circuit is turned on is smaller than that for the output contact circuits.

According to this configuration, at the time of ON operation by the switch input, the reference contact circuit is turned on at a timing earlier than the other output contact circuits. In this case, it is possible to output a signal indicating the state of ON operation when the reference contact circuit is in a state of ON operation and the other output contact circuits are in an ON state. When the reference contact circuit is in an OFF state and any one of the other output contact circuits is in an ON state, it is possible to determine that either the reference contact circuit or any one of the output contact circuits in an ON state has certainly failed and to display an alarm or the like. Therefore, since it is possible to improve the accuracy of failure detection when the contact of one location fails, it is possible to increase safety by determining a failure more reliably.

In the operation device according to the aspect of the present invention, the contact circuits may include the one reference contact circuit and the two or more output contact circuits, and the determination unit may determine that the operation unit is in the ON operation state or in the non-operation state based on the ON state or the OFF state of each of the contact circuits.

According to this configuration, three or more contact circuits are provided, and it is possible to determine that the operation unit is in a state of ON operation based on the state of each of the three or more contact circuits and to output a signal indicating that the operation unit is in a state of ON operation. In this case, even if any one of the contact circuits fails, it is possible to continue the operation by determining the state of ON operation using the two remaining contact circuits. Therefore, it is not necessary to stop the output immediately only due to the failure of one contact circuit.

In addition, in the operation device according to the aspect of the present invention, an odd number of contact circuits may be provided, and the determination unit may determine that the operation unit is in the ON operation state or in the non-operation state by a majority of the odd number of contact circuits based on the ON state or the OFF state of each of the contact circuits.

According to this configuration, an odd number of three or more contact circuits are provided, and it is possible to determine that the operation unit is in a state of ON operation by a majority of the odd number of three or more contact circuits based on the ON state or the OFF state of each of the odd number of three or more contact circuits and to output a signal indicating that the operation unit is in a state of ON operation. Since the determination is performed based on the state of each of the three or more contact circuits, it is possible to specify the contact circuit that has failed first. In addition, since it is determined that the operation unit is in a state of ON operation or in a state of non-operation using the remaining contact circuits even if one contact circuit fails, there is no problem in the operation of the operation device.

In addition, in the operation device according to the aspect of the present invention, the reference contact circuit may be disposed at a position between the two or more output contact circuits in a direction perpendicular to a direction in which the movable contact moves from the initial position to the end position.

According to this configuration, when the reference contact circuit is located at the approximate center position between the two or more output contact circuits, the influence of rattling with respect to the movement of the movable contact is the smallest. In this case, the reference contact circuit can be stably turned on at a timing earlier than the other contact circuits.

In addition, in the operation device according to the aspect of the present invention, the movable contact may be a slider configured to be slidable while being in contact with the fixed terminals.

According to this configuration, since a sliding contact mechanism is used in which the switching of contacts is performed by sliding contact between the fixed terminals and the slider, it is possible to increase the safety of the operation device.

In addition, in the operation device according to the aspect of the present invention, each of the plurality of contact circuits may include fixed electrodes formed in the plurality of fixed terminals, and the movable contact may be a switch unit configured to be able to be in elastic contact with the plurality of fixed electrodes.

According to this configuration, it becomes easy to manufacture the operation device by using a switch unit, which includes the movable contact and the fixed electrodes, for the plurality of contact circuits.

The operation device according to the aspect of the present invention may be for operating a vehicle transmission.

By using the operation device for the operation of the vehicle transmission, it is possible to perform more reliable gear shifting.

According to the aspect of the present invention, the reference contact circuit is provided such that the distance from the initial position where the movable contact starts to move to the position where the reference contact circuit is turned on is smaller than that for the output contact circuits. In this case, it is possible to output a signal indicating the state of ON operation when the reference contact circuit is in a state of ON operation and the other output contact circuits are in an ON state. When the reference contact circuit is in an OFF state and any one of the other contact circuits is in an ON state, it is possible to determine that either the reference contact circuit or any one of the contact circuits in an ON state has certainly failed and to display an alarm or the like. Therefore, since it is possible to generate an operation signal by switch input and to improve the accuracy of failure detection when the contact of one location fails, it is possible to provide an operation device capable of determining a failure more reliably.

BRIEF DESCRIPTION OF THE DRAWINGS

FIG. 7 is an explanatory view showing an output of the operation device according to the first embodiment of the present invention;

FIG. 8 is an explanatory view showing an output when two contact circuits are provided;

FIG. 10 is an explanatory view showing an output in the first modification of the first embodiment of the present invention;

FIG. 14 is an explanatory view showing an output in the first comparative example;

FIG. 15 is an explanatory view showing an output in the second comparative example, and is an explanatory view showing an output when two contact circuits are provided;

FIG. 19A shows a fixed electrode in plan view and FIG. 19B is a cross-sectional view taken along the line B-B of FIG. 19A;

FIG. 20 is an explanatory view when the operation device according to the second embodiment is applied to a vehicle transmission;

FIG. 21 is an explanatory view showing a state in which the contact circuit shown in FIG. 18 is located at an initial position;

FIG. 24 is an explanatory view showing an output of the operation device according to the second embodiment;

FIG. 25 is an explanatory view showing an output when two contact circuits are provided.

DESCRIPTION OF THE PREFERRED EMBODIMENTS

Hereinafter, an embodiment of the present invention will be described in detail with reference to the accompanying drawings. In addition, for easy understanding, the diagrams are appropriately changed in size.

First Embodiment

Figure 1:
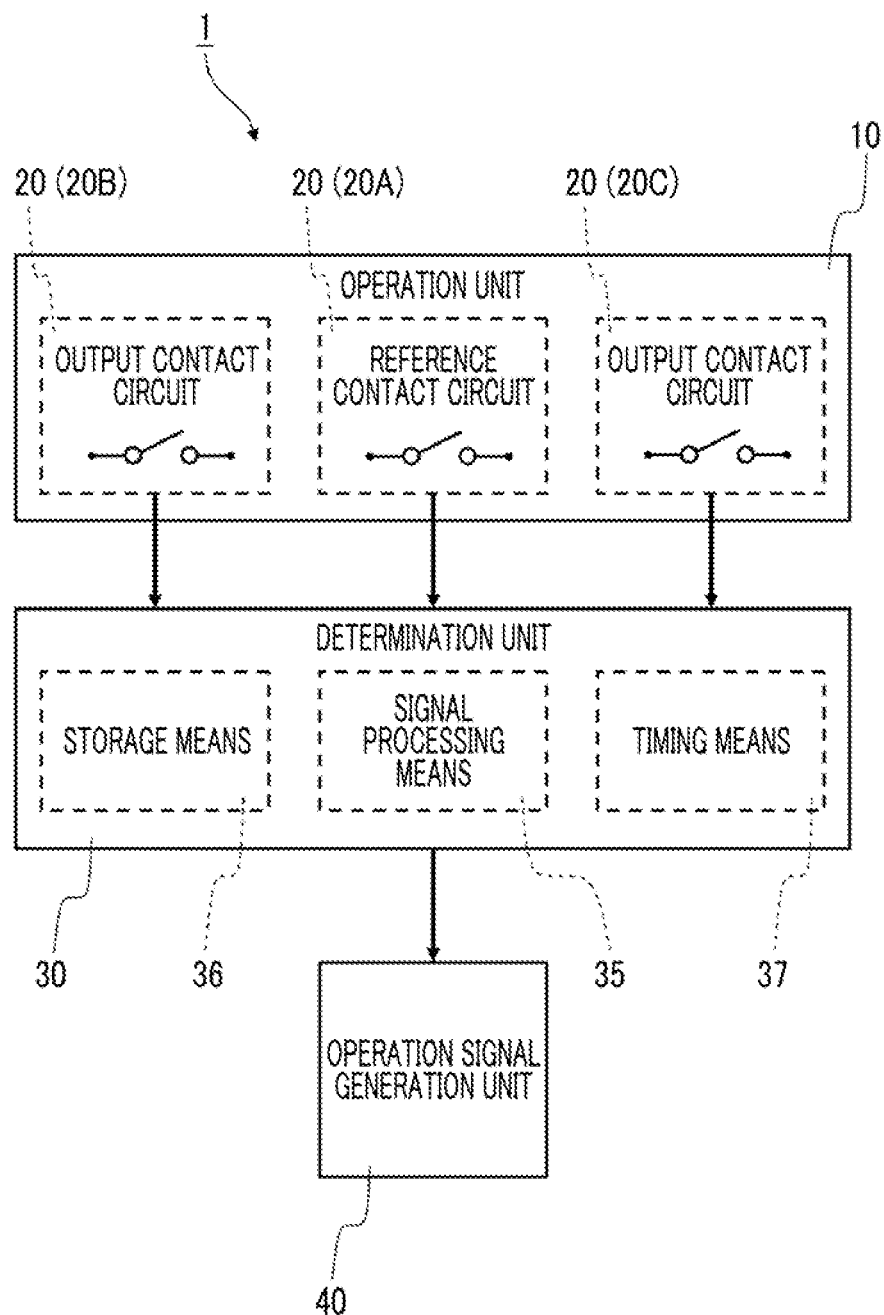
FIG. 1 is a block diagram showing an operation device according to an embodiment of a first invention.
Figure 2:
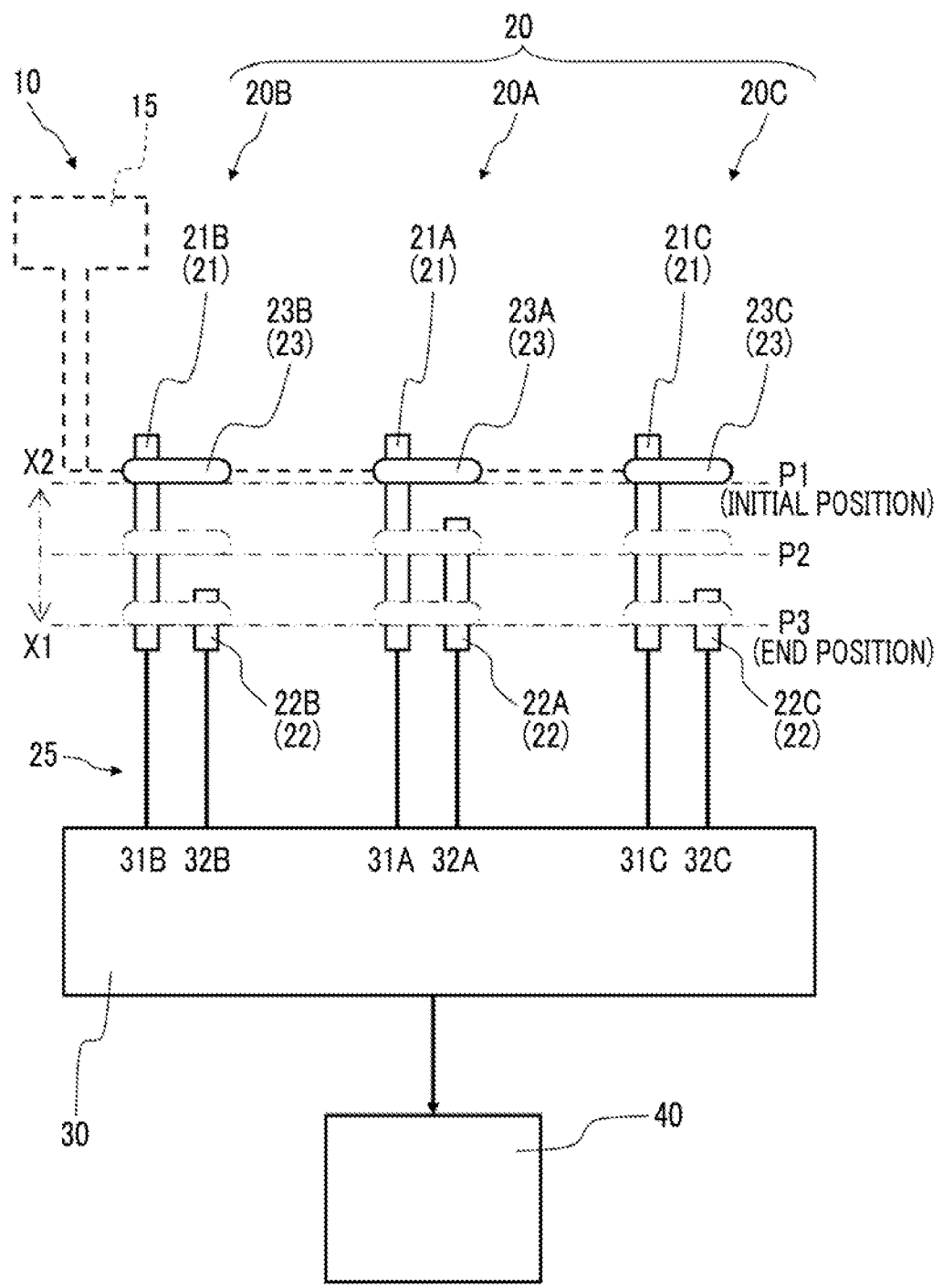
FIG. 2 is an explanatory view showing an operation unit shown in FIG. 1.
Figure 3:
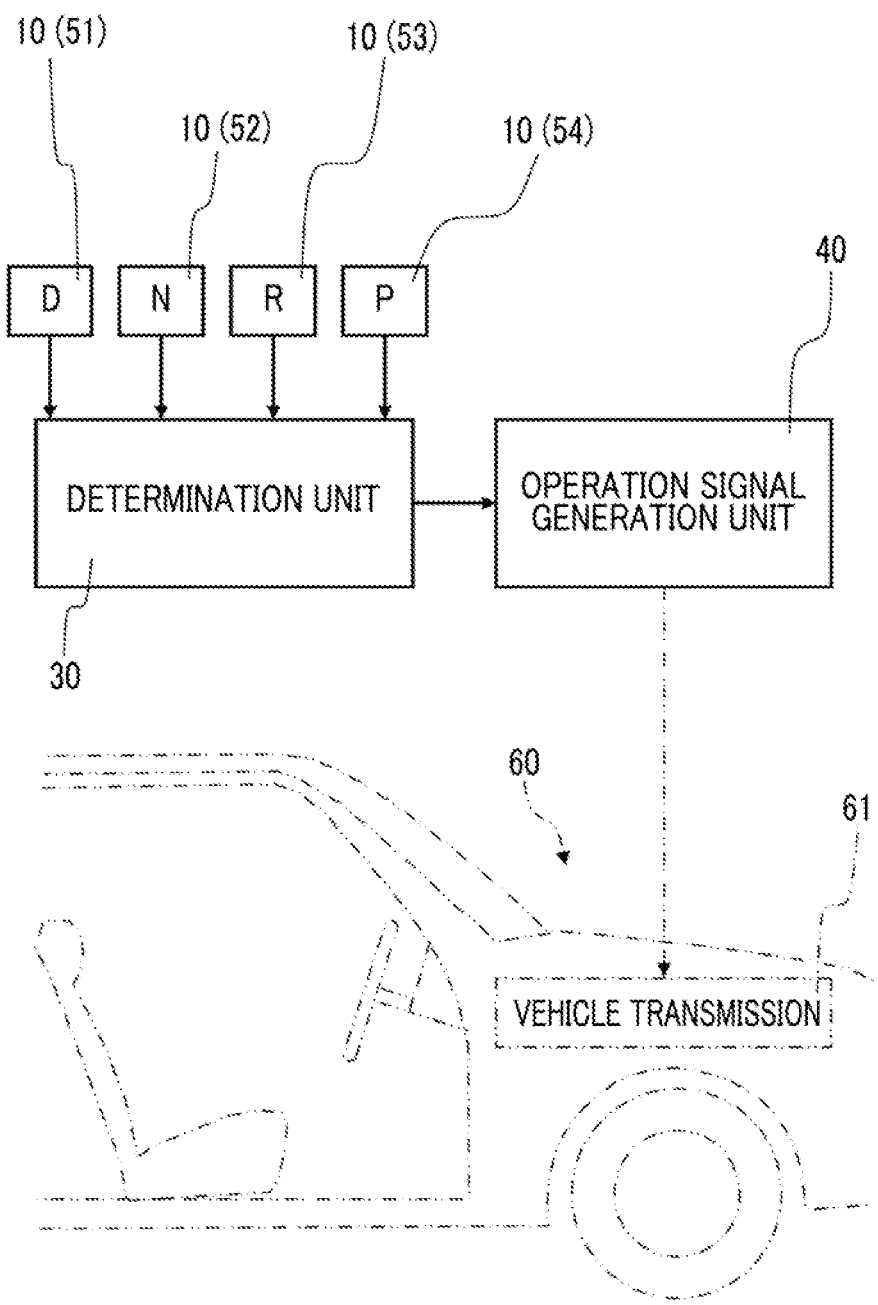
FIG. 3 is an explanatory view when the operation device according to the first embodiment of the present invention is applied to a vehicle transmission.
Figure 4:
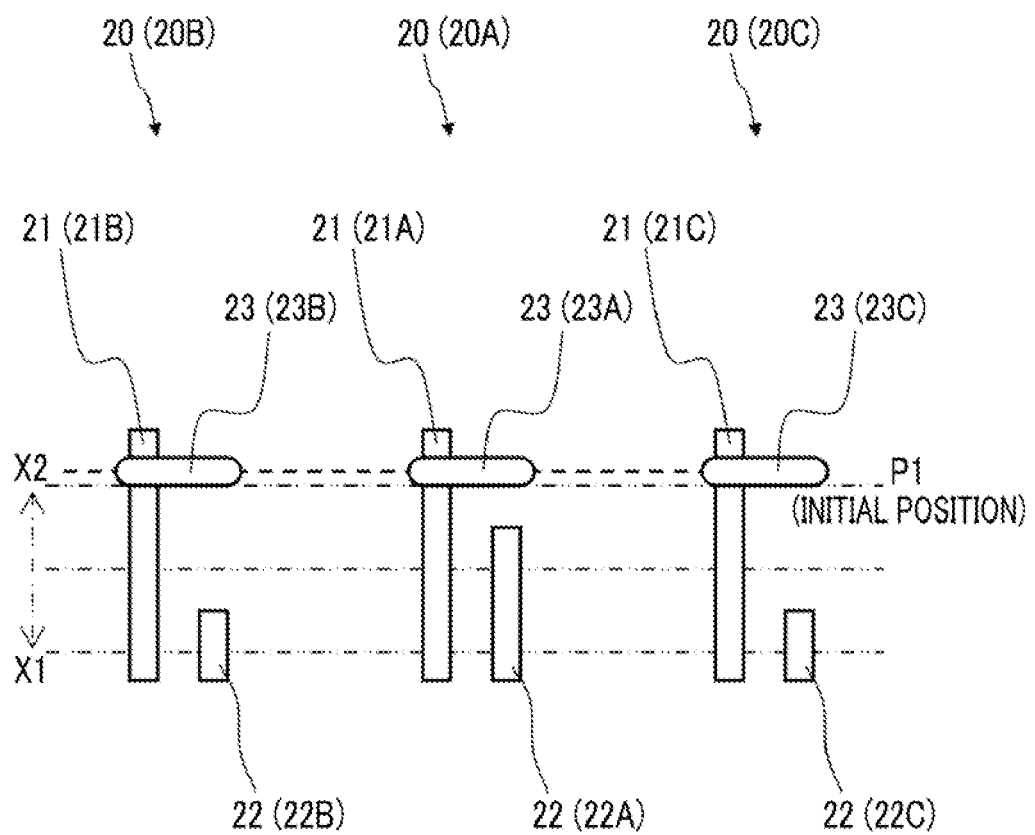
FIG. 4 is an explanatory view showing a state where a slider of the operation unit shown in FIG. 2 is at an initial position.
Figure 5:
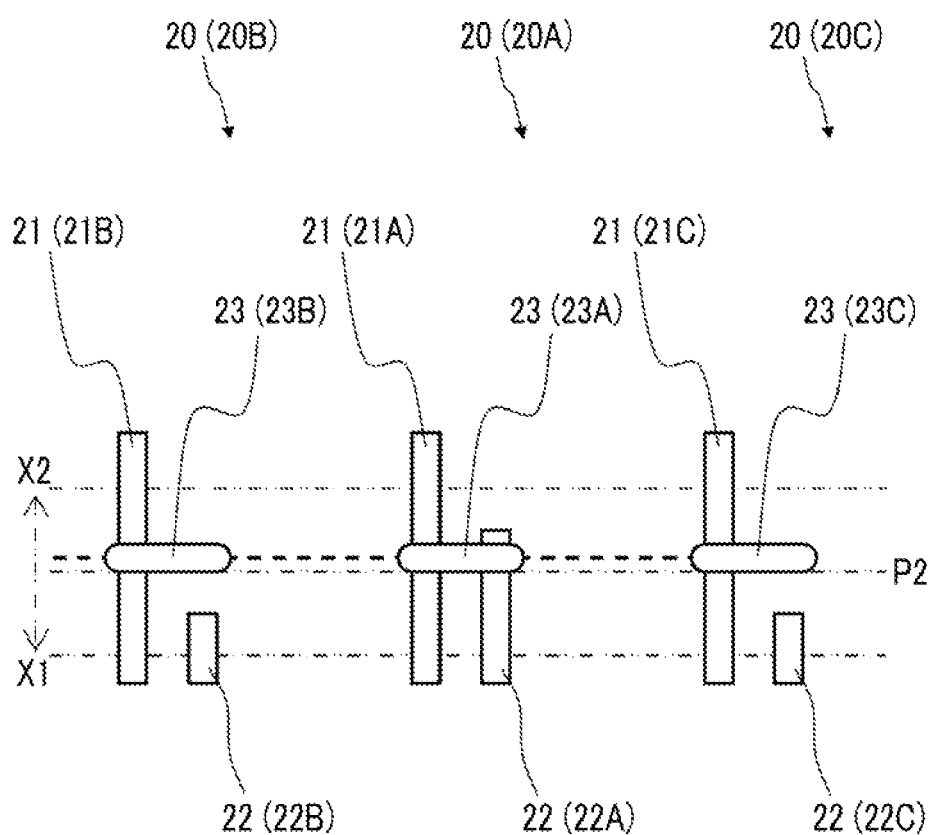
FIG. 5 is an explanatory view showing a state where the slider of the operation unit shown in FIG. 2 is at a transient state position.
Figure 6:
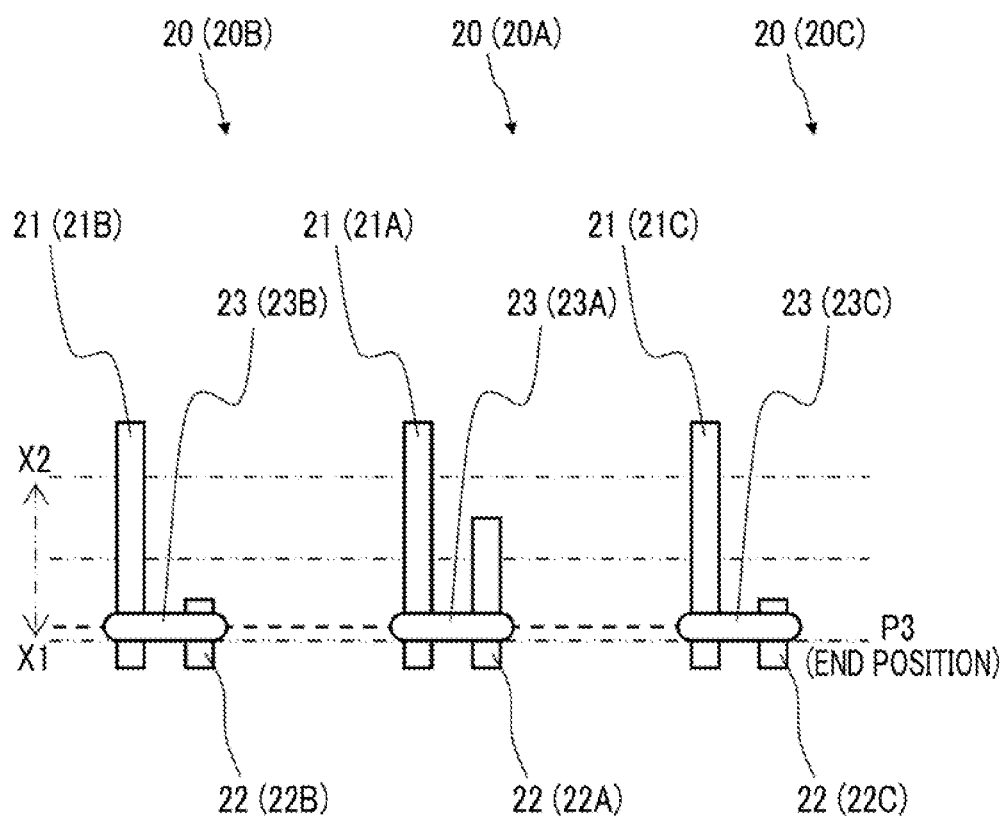
FIG. 6 is an explanatory view showing a state where the slider of the operation unit shown in FIG. 2 is at an end position.

FIG. 1 is a block diagram showing an operation device 1 according to a first embodiment of the present invention. FIG. 2 is an explanatory view showing an operation unit 10 shown in FIG. 1. FIG. 3 is an explanatory view when the operation device 1 according to the first embodiment of the present invention is applied to a vehicle transmission 61. FIG. 4 is an explanatory view showing a state in which a slider 23 of the operation unit 10 shown in FIG. 2 is located at an initial position P1. FIG. 5 is an explanatory view showing a state in which the slider 23 of the operation unit 10 shown in FIG. 2 is located at a position P2 of a transient state. FIG. 6 is an explanatory view showing a state in which the slider 23 of the operation unit 10 shown in FIG. 2 is located at an end position P3.

As shown in FIG. 1, the operation device 1 according to the present embodiment includes the operation unit 10, a determination unit 30, and an operation signal generation unit 40. The operation unit 10 for performing an input operation includes a plurality of contact circuits 20. In FIG. 1, as the contact circuit 20, output contact circuits 20B and 20C and a reference contact circuit 20A are provided. The determination unit 30 includes signal processing means 35, storage means 36, and timing means 37, and determines that the operation unit 10 is in a state of ON operation or in a state of non-operation based on the ON state or OFF state of each contact circuit 20. The operation signal generation unit 40 outputs a signal indicating that the operation unit 10 is in a state of ON operation based on the determination result of the determination unit 30.

As shown in FIG. 2, the operation unit 10 includes an operation member 15 that is operated for input, a slider 23 mechanically connected to the operation member 15, and the reference contact circuit 20A and the output contact circuits 20B and 20C as the contact circuit 20 formed by fixed terminals 21 and 22 disposed discretely. The slider 23 that is a movable contact moves in an X1-X2 direction by an input operation performed on the operation member 15. In addition, the direction of an input operation performed on the operation member 15 is not limited to the X1-X2 direction in which the slider 23 moves, and the direction may be changed through the direction change mechanism.

Each of the fixed terminals 21A, 22A, 21B, 22B, 21C, and 22C is formed by processing a conductive metal plate into a rectangular shape whose longitudinal direction is the X1-X2 direction shown in FIG. 2. For example, the fixed terminals 21A, 22A, 21B, 22B, 21C, and 22C are disposed and fixed on an insulating resin (not shown). The fixed terminals 21A, 22A, 21B, 22B, 21C, and 22C are connected to conductors 25, and are electrically connected to connection terminals 31A, 32A, 31B, 32B, 31C, and 32C provided in the determination unit 30, respectively.

Each of sliders 23A, 23B, and 23C that are movable contacts is formed by processing a conductive metal plate. The sliders 23A, 23B, and 23C are electrically insulated from each other, but are configured so as to move in conjunction with each other in the X1-X2 direction through the operation member 15. The slider 23A is processed into a shape that allows sliding to the fixed terminals 21A and 22A and allows electrically stable connection by a spring property given thereto. The slider 23B is processed into a shape that allows sliding to the fixed terminals 21B and 22B and allows electrically stable connection by a spring property given thereto. The slider 23C is processed into a shape that allows sliding to the fixed terminals 21C and 22C and allows electrically stable connection by a spring property given thereto. In addition, the slider 23 may have other shapes as long as electrically stable connection is possible.

As shown in FIG. 2, at the initial position P1, the sliders 23A, 23B, and 23C that are movable contacts are not in contact with the fixed terminals 22A, 22B, and 22C. Therefore, at the initial position P1, a plurality of contact circuits 20 of the reference contact circuit 20A and the output contact circuits 20B and 20C are all turned off. As shown in FIG. 2, at the position P2 in the middle of operation, the slider 23A comes in contact with the fixed terminal 22A to be electrically connected to the fixed terminal 21A. At the end position P3, the slider 23B comes in contact with the fixed terminal 22B to be electrically connected to the fixed terminal 21B. At the end position P3, the slider 23C comes in contact with the fixed terminal 22C to be electrically connected to the fixed terminal 21C. The sliders 23A, 23B, and 23C can move in conjunction with each other toward the X1 side until a plurality of contact circuits 20 of the reference contact circuit 20A and the output contact circuits 20B and 20C are all turned on by an input operation performed on the operation member 15. That is, in the contact circuit 20, the slider 23 can selectively change a state between the fixed terminals 21 and 22 to an ON state or an OFF state in response to an ON operation performed on the operation member 15. In addition, the sliders move in conjunction with each other from the initial position P1 where all of the contact circuits 20 are in an OFF state to the end position P3 where all of the contact circuits 20 are turned on.

As shown in FIG. 2, the reference contact circuit 20A is provided such that the distance from the initial position P1 where the slider 23A starts to move to the position P2 at which the reference contact circuit 20A is turned on, is smaller than that for the output contact circuit 20B. Therefore, at the time of ON operation of the operation unit 10, the reference contact circuit 20A is turned on at a timing earlier than the output contact circuit 20B. When the other output contact circuit 20B is turned on while the reference contact circuit 20A is in an ON state, the operation unit 10 is in a state of ON operation. Accordingly, the determination unit 30 determines that the operation unit 10 is in a state of ON operation. Then, the operation signal generation unit 40 can output a signal indicating that the operation unit 10 is in a state of ON operation. In explanatory views including FIG. 2, positions where the slider 23 and the fixed terminal 22 are in contact with each other are slightly shifted so as to overlap each other. However, this is for easy understanding of the explanatory views. Similarly, the initial position P1, the end position P3, and the position P2 where the reference contact circuit 20A is turned on are shown so as to be slightly shifted from each other.

As shown in FIG. 3, the operation device 1 according to the present embodiment is for operating the vehicle transmission 61. As the operation unit 10 for operating the vehicle transmission 61 mounted in a vehicle 60, for example, a drive (D) button 51, a neutral (N) button 52, a reverse (R) button 53, and a park (P) button 54 are disposed, and a plurality of contact circuits 20 shown in FIG. 2 are provided in the respective buttons. The six conductors 25 shown in FIG. 2 are connected to the plurality of operation units 10 (the D button 51, the N button 52, the R button 53, and the P button 54). The plurality of operation units 10 are connected to the common determination unit 30 through the conductors 25. The determination unit 30 determines that any one of the D button 51, the N button 52, the R button 53, and the P button 54 is in a state of ON operation, and the operation signal generation unit 40 outputs a signal indicating that the D button 51, the N button 52, the R button 53, or the P button 54 is in a state of ON operation based on the determination result of the determination unit 30. The vehicle transmission 61 shifts gears when receiving one of the operation signals. In addition, the operation signal generation unit 40 and the vehicle transmission 61 are connected to each other through an in-vehicle network. For example, a controller area network (CAN) is used.

In operation of the vehicle transmission 61, if a signal indicating the state of ON operation is erroneously output even though the vehicle transmission 61 is not being operated, a possibility that the driving of the vehicle 60 will be dangerous is high. Therefore, in the past, a plurality of contact circuits are provided and a signal indicating the state of ON operation is output when the plurality of contact circuits are turned on simultaneously, thereby reducing the possibility of erroneous output. In addition, a failure mode in which no signal indicating the state of ON operation is output even though the ON operation is being performed is generally considered to be less dangerous for driving of the vehicle. In this case, if any one of the plurality of contact circuits is in an OFF state, "no ON-operation state" may be determined. In addition, if the OFF state of other contact circuits continues when any one of the contact circuits is in an ON state, it may be determined that failure of the short-circuit mode or failure of the disconnection mode has occurred, and an alarm or the like may be displayed. Thus, there has been a problem of erroneous failure detection that an alarm or the like is displayed if an operation state, such as half-pressing an operation button, continues even if there is no problem in contact circuits.

Since the operation device 1 according to the present embodiment has the features described below, it is possible to reduce the possibility of erroneous failure detection compared with the related art.

As shown in FIGS. 2 and 4, in the contact circuit 20 of the present embodiment, the sliders 23B, 23A, and 23C that are movable contacts are aligned in a direction perpendicular to the X1-X2 direction in which the sliders 23B, 23A, and 23C move. At the initial position P1 in a normal state where there is no failure of the short-circuit mode, a plurality of contact circuits 20 of the reference contact circuit 20A and the output contact circuits 20B and 20C are all turned off.

When the sliders 23A, 23B, and 23C are moved, as shown in FIG. 5, the reference contact circuit 20A is turned on if the slider 23A is at the position P2 in the middle of operation. At the position P2 shown in FIGS. 2 and 5, the slider 23B is not in contact with the fixed terminal 22B. In addition, at the position P2, the slider 23C is not in contact with the fixed terminal 22C. The distance from the initial position P1 where the slider 23A starts to move to the position P2 where the reference contact circuit 20A is turned on is set to be smaller than that for the output contact circuits 20B and 20C. Accordingly, the reference contact circuit 20A is turned on earlier than the output contact circuits 20B and 20C.

In general, in the contact circuit configured to include a fixed contact and a slider, it is not possible to reduce to zero the influence of rattling with respect to the movement of the slider. Accordingly, the size of the contact circuit is determined by allowing the rattling of the slider. For this reason, even if three sliders are aligned in a direction perpendicular to the X1-X2 direction in which the sliders move, a timing at which each circuit is turned on cannot be fixed due to the influence of rattling with respect to the movement of the slider. In the present embodiment, however, the reference contact circuit 20A is necessarily turned on earlier than the output contact circuits 20B and 20C. For example, if there is uncertainty at a distance of 1 mm due to the influence of rattling, it is possible to eliminate the influence of rattling by setting the positions where each contact circuit is turned on at a distance of 1.5 mm so as to be shifted from each other.

When the reference contact circuit 20A is located at the approximate center position between the two or more output contact circuits 20B and 20C, the influence of rattling with respect to the movement of the slider 23 is the smallest. In this case, the reference contact circuit 20A can be stably turned on at a timing earlier than the other contact circuits. As a result, since it is possible to reduce the margin in determining the size of the contact circuit by allowing the rattling of the slider, it is possible to reduce the size of the operation device 1.

After the sliders 23A, 23B, and 23C are further moved, as shown in FIG. 6, the sliders 23A, 23B, and 23C are moved to the end position P3 where all of the contact circuits 20 are turned on. That is, the output contact circuits 20B and 20C move to the end position P3 where the sliders 23B and 23C are turned on, and the reference contact circuit 20A continues an ON state even when the slider 23A is at the end position P3. In a normal state where there is no failure of the disconnection mode, all of the plurality of contact circuits 20 of the reference contact circuit 20A and the output contact circuits 20B and 20C are turned on.

In the present embodiment, since the three contact circuits 20 are provided, it is possible to determine that the operation unit 10 is in a state of ON operation or in a state of non-operation by majority when only one contact circuit is turned on or off in a different manner from the other two contact circuits. In addition, this state occurs not only when one of the three contact circuits has failed but also in a transient state (refer to FIG. 5) that is an intermediate operation state before all of the contact circuits 20 are turned on from the OFF state. Therefore, it is preferable to perform failure determination in consideration of the duration. In addition, if no abnormality occurs in the two remaining contact circuits even after the failure of one contact circuit has been determined, it is preferable to enable the same operation as in the normal situation since the states of the two remaining contact circuits are the same as the ON state or the OFF state.

Figure 13:
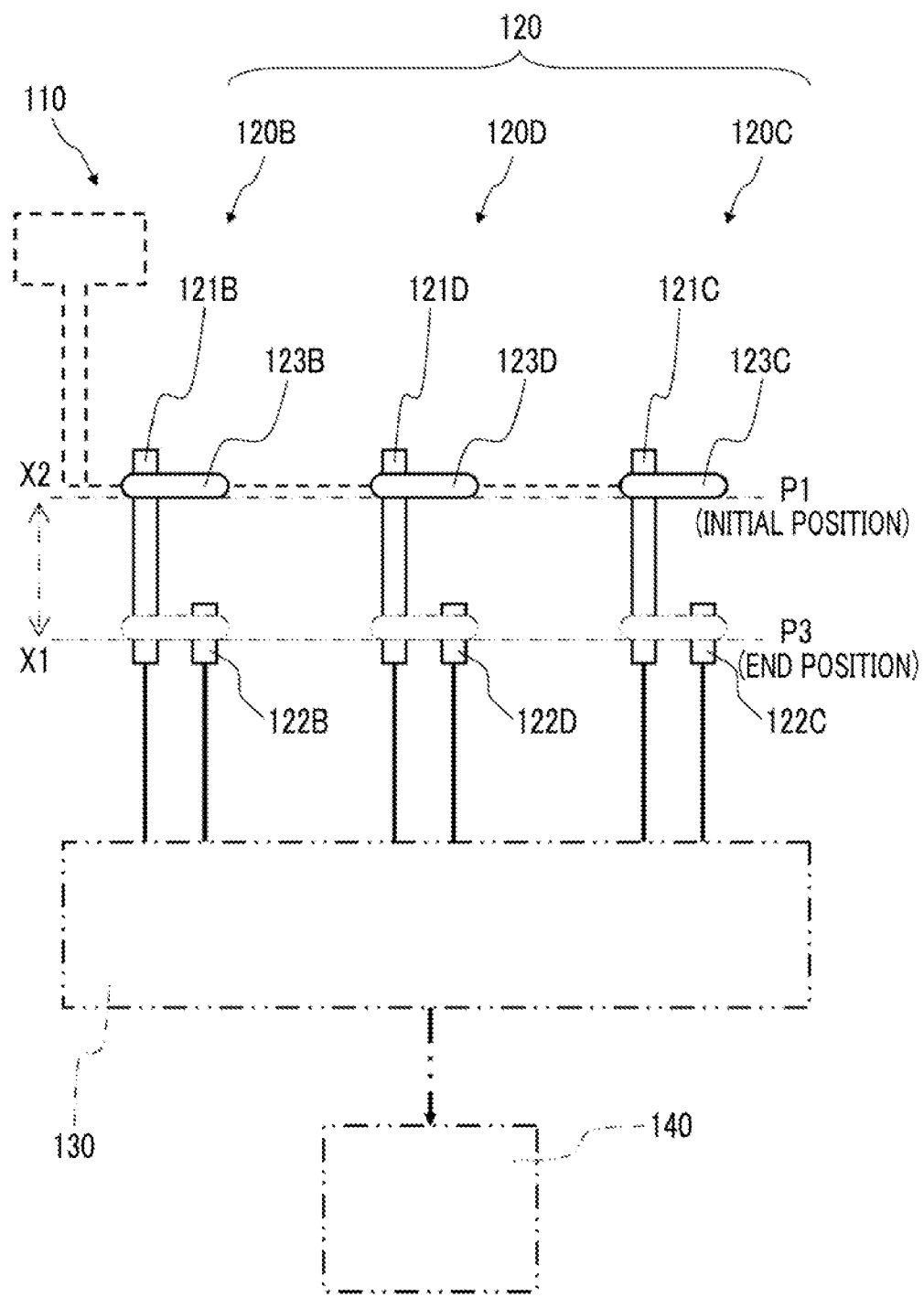
FIG. 13 is an explanatory view showing the operation unit in the first comparative example.

Next, the features of the determination unit 30 in the present embodiment will be described. FIG. 7 is an explanatory view showing an output of the operation device 1 according to the embodiment of the present invention. FIG. 8 is an explanatory view showing an output when the number of contact circuits 20 is two. Here, for easy understanding of the present embodiment, the present embodiment will be compared with first and second comparative examples that are known in the related art. FIG. 13 is an explanatory view showing an operation unit 110 of the first comparative example. The first comparative example shown in FIG. 13 is a case where there is no reference contact circuit and determination is performed by three output contact circuits 120B, 120C, and 120D having the same distance from the initial position P1 to the end position P3 where each circuit is turned on. FIG. 14 is an explanatory view showing an output in the first comparative example. FIG. 15 is an explanatory view showing an output in the second comparative example, and is an explanatory view showing an output when two output contact circuits having the same distance to the end position P3 where each circuit is turned on are provided.

As shown in FIG. 2, the determination unit 30 in the present embodiment includes the connection terminals 31A, 32A, 31B, 32B, 31C, and 32C electrically connected to the contact circuit 20. In addition, as shown in FIG. 1, the determination unit 30 includes the signal processing means 35 for signal processing with respect to the state of the contact circuit 20, the storage means 36 for storing the processing content of the signal processing means 35, and the timing means 37.

The signal processing means 35 in the present embodiment determines that the operation unit 10 is in a state of ON operation or in a state of non-operation based on the ON state or OFF state of each of the reference contact circuit 20A and the output contact circuits 20B and 20C connected to the connected terminals 31A, 32A, 31B, 32B, 31C, and 32C. According to each state, a determination result shown in FIG. 7 is output from the operation signal generation unit 40. As the first comparative example of the present embodiment, when there is no reference contact circuit and three output contact circuits are provided, a determination result shown in FIG. 14 is obtained. In FIGS. 7 and 14, an OFF state is expressed as "0", and an ON state is expressed as "1".

As in the first comparative example shown in FIG. 14, when there is no reference contact circuit and three output contact circuits 120B, 120C, and 120D are provided, there are six kinds of transient states in the middle of operation. In addition, the relationship between the number of circuits and the number of transient states can be easily calculated. In addition, when an odd number of circuits are provided as shown in FIG. 14, a state of ON operation or a state of non-operation can be determined by a majority of an odd number of circuits at the time of contact failure of one location or in the transient state in the middle of operation. In the case of remark i, it is determined either that the output contact circuit 120B is in an ON state in a transient state or that the output contact circuit 120B is in a short-circuit failure mode. In the case of remark j, it is determined either that the output contact circuit 120C is in an ON state in a transient state or that the output contact circuit 120C is in a short-circuit failure mode. In the case of remark k, it is determined either that the output contact circuit 120D is in an ON state in a transient state or that the output contact circuit 120D is in a short-circuit failure mode. In the case of remark l, it is determined either that the output contact circuit 120D is in an OFF state in a transient state or that the output contact circuit 120D is in a disconnection failure mode. In the case of remark m, it is determined either that the output contact circuit 120C is in an OFF state in a transient state or that the output contact circuit 120C is in a disconnection failure mode. In the case of remark n, it is determined either that the output contact circuit 120B is in an OFF state in a transient state or that the output contact circuit 120B is in a disconnection failure mode. In these states, an alarm or the like can be displayed. In this case, however, the alarm or the like is displayed even in a transient state. Therefore, erroneous failure detection is avoided by the measurement of elapsed time or the like.

The operation device 1 according to the present embodiment includes the reference contact circuit 20A and the output contact circuits 20B and 20C as the contact circuit 20, unlike in the first comparative example shown in FIG. 13. As shown in FIG. 7, in the operation device 1 according to the present embodiment, in a transient state in the middle of operation in which the slider 23A is located at the position P2 to end position P3, the reference contact circuit 20A is always in an ON state. In addition, since an odd number of circuits are provided as the contact circuits 20 in the present embodiment, a state of ON operation or a state of non-operation can be determined by a majority of an odd number of circuits. The case of remark a corresponds to either a normal transient state or short-circuit failure of the reference contact circuit 20A. The case of remark b corresponds to any one of a normal transient state, short-circuit failure of the output contact circuit 20B, and disconnection failure of the output contact circuit 20C. The case of remark c corresponds to any one of a normal transient state, disconnection failure of the output contact circuit 20B, and short-circuit failure of the output contact circuit 20C, and an alarm or the like can be displayed. In the cases of remarks a, b, and c, an alarm or the like is displayed even in a normal transient state. Therefore, erroneous failure detection is avoided by the measurement of elapsed time or the like. In addition, if at least one of the output contact circuits 20B and 20C is in an ON state and the reference contact circuit 20A is in an OFF state, one contact circuit is necessarily defective. The case of remark d corresponds to either disconnection failure of the reference contact circuit 20A or short-circuit failure of the output contact circuit 20C, and an alarm or the like can be displayed. The case of remark e corresponds to either disconnection failure of the reference contact circuit 20A or short-circuit failure of the output contact circuit 20B, and an alarm or the like can be displayed. In the case of remark f, disconnection failure of the reference contact circuit 20A is determined, and an alarm or the like can be displayed.

When FIG. 7 is compared with FIG. 14, it is possible to generate an output from the operation signal generation unit 40 by the switch input and to improve the accuracy of failure detection when the contact of one location fails by adopting the present embodiment. Therefore, it is clear that safety can be increased by determining a failure more reliably.

In addition, the reason why the state of ON operation or the state of non-operation is determined by a majority of three contact circuits is that there is almost no possibility that two contact circuits will fail simultaneously. For example, when an electrical circuit fails due to submergence or the like, three contact circuits fail simultaneously. However, when contact failure occurs due to foreign material or the like, a possibility that the foreign material will influence two contact circuits is very low. In addition, after the failure of one contact circuit has been determined, determination can be performed by using the two remaining contact circuits until a second failure occurs. The operation device 1 according to the present embodiment is for operating the vehicle transmission 61. Accordingly, even when the failure of the contact circuit 20 is detected during the driving, the vehicle transmission 61 can be continuously operated without falling into the state where the vehicle transmission 61 cannot be operated suddenly. As a result, the driver can move the vehicle 60 to a safer place.

The operation device 1 according to the present embodiment includes the storage means 36. Therefore, when the failure of one contact circuit has been determined, the content of failure determination can be stored, and subsequent determination can be performed by using two contact circuits that have not failed. In addition, the operation device 1 according to the present embodiment includes the timing means 37. Therefore, by measuring the elapsed time in each state shown in FIG. 7, it is possible to perform determination or display an alarm or the like when there is no change in the state after the elapsed time set in advance. After the failure of one contact circuit has been determined, a state of ON operation or a state of non-operation cannot be determined by a majority of three contact circuits. However, since the other two contact circuits are normal, it is possible to reduce erroneous failure detection by performing the determination by combining the timing means 37 with the other two contact circuits.

In addition, when the operation device 1 according to the present embodiment is for operating the vehicle transmission 61, it is preferable to perform determination regarding subsequent operations after determining that all of three contact circuits are in an OFF state, immediately after the determination unit 30 starts the operation (immediately after electric power is supplied). In this manner, it is possible to avoid a problem, such as sudden acceleration immediately after the operation start due to erroneous operation of the operation member 15. In addition, after the failure of one contact circuit has been determined, the condition is changed to determination that the two remaining contact circuits are in an OFF state.

In the operation device 1 according to the present embodiment, even if one reference contact circuit 20A and one output contact circuit 20B are provided, there is an effect that is different from the case where there is no reference contact circuit and only the two output contact circuits 120B and 120C are provided. In FIGS. 8 and 15, an OFF state is expressed as "0", and an ON state is expressed as "1".

As shown in FIG. 15, when there is no reference contact circuit and two output contact circuits 120B and 120C are provided, there are four kinds of states including two states in which both the output contact circuits 120B and 120C are in an OFF state and both the output contact circuits 120B and 120C are in an ON state and two transient states caused by the influence of rattling in the middle of the operation. Among these states, only when both the output contact circuits 120B and 120C are in an ON state, a signal indicating the state of ON operation is output. When one of the output contact circuits 120B and 120C is in an ON state as indicated by the remarks o and p, disconnection failure or a transient state in the middle of operation cannot be determined Therefore, no signal is output in consideration of safety. In these states, an alarm or the like can be displayed. In this case, however, the alarm or the like is displayed even in a transient state. Therefore, erroneous failure detection should be avoided by the measurement of elapsed time or the like.

As shown in FIG. 8, also when one reference contact circuit 20A and one output contact circuit 20B are provided, the reference contact circuit 20A should always be in an ON state in a transient state in the middle of operation in which the slider 23A is located at the position P2 to end position P3. In the case of remark g, a normal transient state, short-circuit failure of the reference contact circuit 20A, or disconnection failure of the output contact circuit 20B cannot be determined. However, in the case of remark h, the failure is either disconnection failure of the reference contact circuit 20A or short-circuit failure of the output contact circuit 20B. Therefore, since it is possible to improve the accuracy of failure detection when the contact of one location fails, it is possible to increase safety by determining a failure more reliably. In the operation device 1 according to the present embodiment, even after the failure of one of the two output contact circuits 20B and 20C has been determined, it is possible to generate an output from the operation signal generation unit 40 by the switch input and to improve the accuracy of failure detection when the contact of one location fails. Therefore, it is possible to increase safety by determining a failure more reliably.

Hereinafter, the effect of the present embodiment will be described.

The operation device 1 according to the present embodiment includes an operation unit 10 for performing an input operation. The operation unit 10 includes a plurality of contact circuits 20 including a plurality of fixed terminals 21 and 22 discretely arranged and sliders 23 that are movable contacts each of which selectively changes a state between the fixed terminals 21 and 22 to an ON state or an OFF state. When the operation unit 10 is in a non-operation state, the slider 23 is at an initial position P1 where all of the plurality of contact circuits 20 are in an OFF state. In response to an ON operation performed on the operation unit 10, the sliders 23 move in conjunction with each other from the initial position P1 to an end position P3 where all of the plurality of contact circuits 20 are turned on. In addition, the operation device 1 according to the present embodiment includes a determination unit 30 to which the contact circuits 20 are connected and configured to determine that the operation unit 10 is in a state of ON operation or in a state of non-operation based on an ON state or an OFF state of each of the contact circuits 20 and an operation signal generation unit 40 configured to output a signal indicating that the operation unit 10 is in a state of the ON operation based on a determination result of the determination unit 30. In addition, assuming that one of the plurality of contact circuits 20 is a reference contact circuit 20A and the others are output contact circuits 20B, the reference contact circuit 20A is provided such that a distance from the initial position P1 where the slider 23 starts to move to a position P2 where the reference contact circuit 20A is turned on is smaller than that for the output contact circuits 20B.

According to this configuration, at the time of ON operation, the reference contact circuit 20A is turned on at a timing earlier than the other output contact circuits 20B. In this case, it is possible to output a signal indicating the state of ON operation when the reference contact circuit 20A is in a state of ON operation and the other output contact circuits 20B are in an ON state. When the reference contact circuit 20A is in an OFF state and any one of the other output contact circuits 20B is in an ON state, it is possible to determine that either the reference contact circuit 20A or any one of the output contact circuits 20B in an ON state has certainly failed and to display an alarm or the like. Therefore, since it is possible to improve the accuracy of failure detection when the contact of one location fails, it is possible to increase safety by determining a failure more reliably.

In addition, in the operation device 1 according to the present embodiment, the contact circuits 20 that are movable contacts may include the one reference contact circuit 20A and two or more output contact circuits 20B and 20C. The determination unit 30 may determine that the operation unit 10 is in the ON operation state or in the non-operation state based on the ON state or the OFF state of each of the contact circuits 20. According to this configuration, three or more contact circuits 20 are provided, and it is possible to determine that the operation unit 10 is in a state of ON operation based on the state of each of the three or more contact circuits 20 and to output a signal indicating that the operation unit 10 is in a state of ON operation. In this case, even if any one of the contact circuits 20 fails, it is possible to continue the operation by determining the state of ON operation using the two remaining contact circuits 20. Therefore, it is not necessary to stop the output immediately only due to the failure of one contact circuit 20.

In addition, in the operation device 1 according to the aspect of the present embodiment, an odd number of three or more contact circuits 20 may be provided, and the determination unit 30 may determine that the operation unit 10 is in the ON operation state or in the non-operation state by a majority of the odd number of contact circuits 20 based on the ON state or the OFF state of each of the contact circuits 20. According to this configuration, an odd number of three or more contact circuits 20 are provided, and it is possible to determine that the operation unit 10 is in a state of ON operation by a majority of the odd number of three or more contact circuits 20 based on the ON state or the OFF state of each of the odd number of three or more contact circuits 20 and to output a signal indicating that the operation unit 10 is in a state of ON operation. Since the determination is performed based on the state of each of the three or more contact circuits 20, it is possible to specify the contact circuit 20 that has failed first. In addition, since it is determined that the operation unit 10 is in a state of ON operation or in a state of non-operation using the remaining contact circuits 20 even if one contact circuit fails, there is no problem in the operation of the operation device 1.

In addition, in the operation device 1 according to the present embodiment, the reference contact circuit 20A may be disposed at a position between the output contact circuits 20B and 20C in a direction perpendicular to a direction in which the slider 23 that is a movable contact moves from the initial position P1 to the end position P3. According to this configuration, when the reference contact circuit 20A is located at the approximate center position between the two or more output contact circuits 20B and 20C, the influence of rattling with respect to the movement of the slider 23 is the smallest. In this case, the reference contact circuit 20A can be stably turned on at a timing earlier than the other contact circuits.

The operation device 1 according to the present embodiment may be for operating the vehicle transmission 61. By using the operation device for the operation of the vehicle transmission 61, it is possible to perform more reliable gear shifting.

While the operation device 1 according to the first embodiment of the present invention has been specifically described above, the invention is not limited to the embodiment described above, and various changes may be made without departing from the scope of the present invention. For example, the following modifications can be implemented, and these also belong to the technical range of the present invention.

(1) In the present embodiment, two of the three contact circuits 20 are set as the output contact circuits 20B and 20C so as to have the same distance from the initial position P1 where the slider 23 starts to move to the position P2 where the contact circuits 20 are turned on. However, the output contact circuit 20C may be changed to an output contact circuit 20D having a larger distance. The first modification is a case where the distances from the initial position P1 to the position P2, at which the contact circuits 20 are turned on, in the three contact circuits 20 are different.

Figure 9:
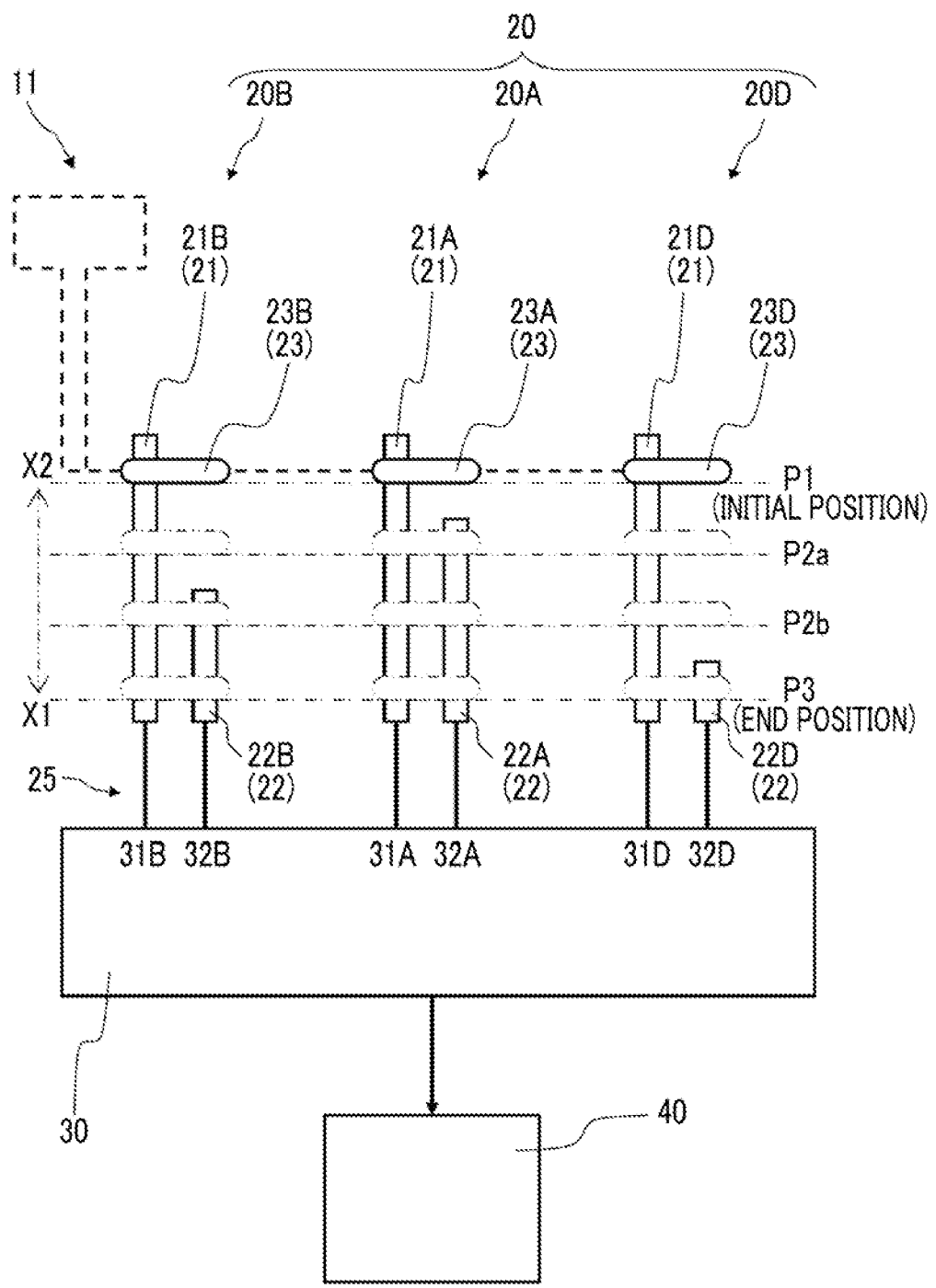
FIG. 9 is an explanatory view showing an operation unit in a first modification of the first embodiment of the present invention.

FIG. 9 is an explanatory view showing an operation unit 11 in the first modification. FIG. 10 is an explanatory view showing an output in the first modification. During the operation until all contact circuits are turned on, the contact circuits are turned on in order of the reference contact circuit 20A having the shortest distance from the initial position P1 where the slider 23A starts to move to a position P2a where the reference contact circuit 20A is turned on, the output contact circuit 20B having the second shortest distance from the initial position P1 where the slider 23B starts to move to a position P2b where the output contact circuit 20B is turned on, and the output contact circuit 20D having the longest distance from the initial position P1 where the slider 23D starts to move to an end position P3 where the output contact circuit 20D is turned on. Therefore, the failure of one contact circuit and the normal transient state can be more clearly determined.

In addition, the state of ON operation or the state of non-operation can be determined by a majority of three contact circuits.

(2) In the present embodiment, the sliders 23 of the three contact circuits 20 are aligned in a direction perpendicular to the X1-X2 direction. However, positions where the three contact circuits 20 are turned on may be aligned side by side, and the initial positions P1 may be disposed so as to be shifted from each other. The second modification is a case where the initial positions P1 are disposed so as to be shifted from each other.

Figure 11:
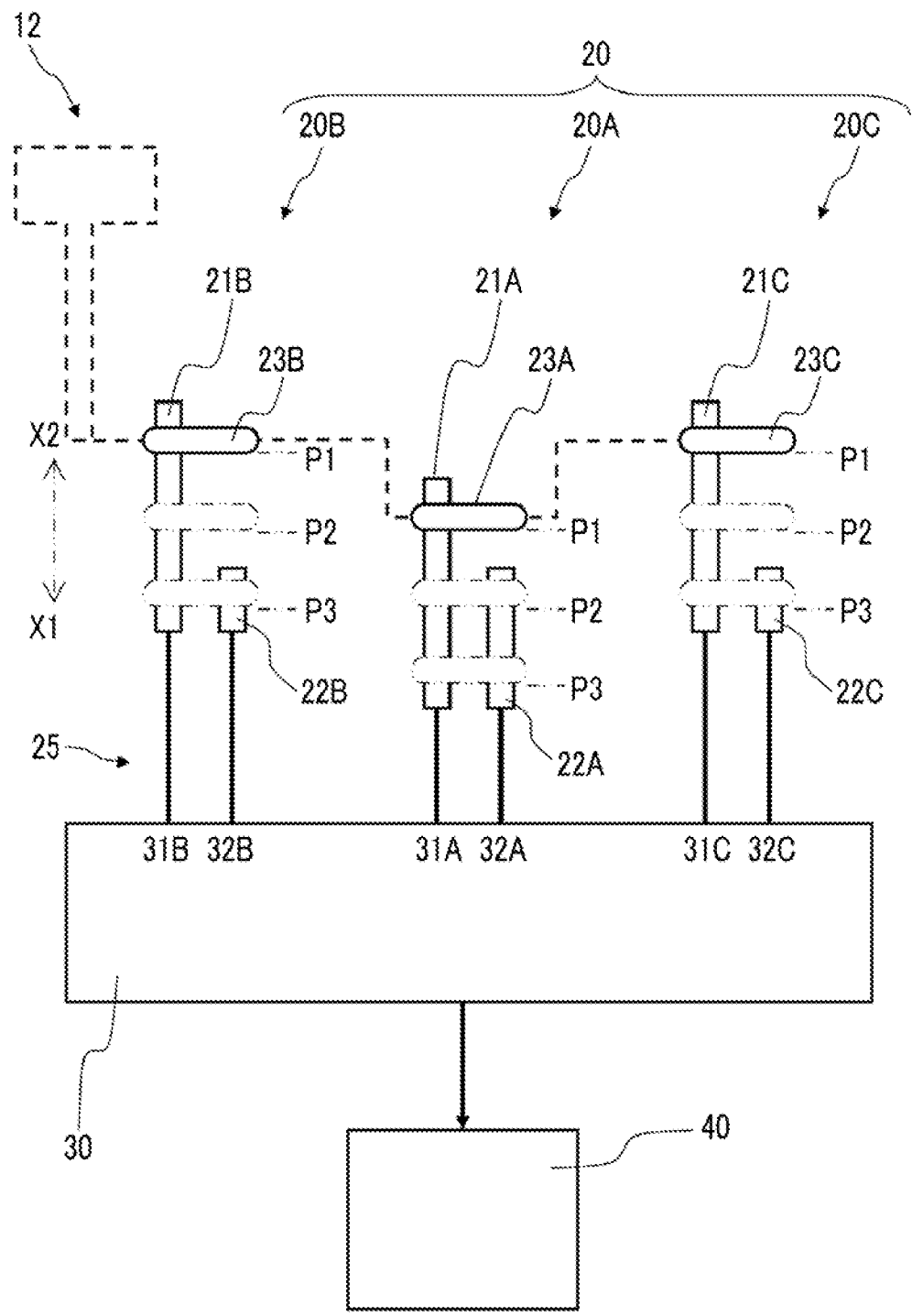
FIG. 11 is an explanatory view showing an operation unit in a second modification of the first embodiment of the present invention.

FIG. 11 is an explanatory view showing an operation unit 12 in the second modification. The operation unit 12 is configured such that the initial position P1 of the reference contact circuit 20A is shifted to the X1 side and the position P2 where the reference contact circuit 20A is turned on is aligned at the same position as the end position P3 where the other output contact circuits 20B and 20C are turned on. Therefore, the distance from the initial position P1 where the slider 23A starts to move to the position P2 where the reference contact circuit 20A is turned on is short.

(3) In the present embodiment, the three contact circuits 20 are aligned in a direction perpendicular to the X1-X2 direction. However, the three contact circuits 20 may be disposed in the X1-X2 direction. The third modification is a case where the three contact circuits 20 are disposed in the X1-X2 direction.

Figure 12:
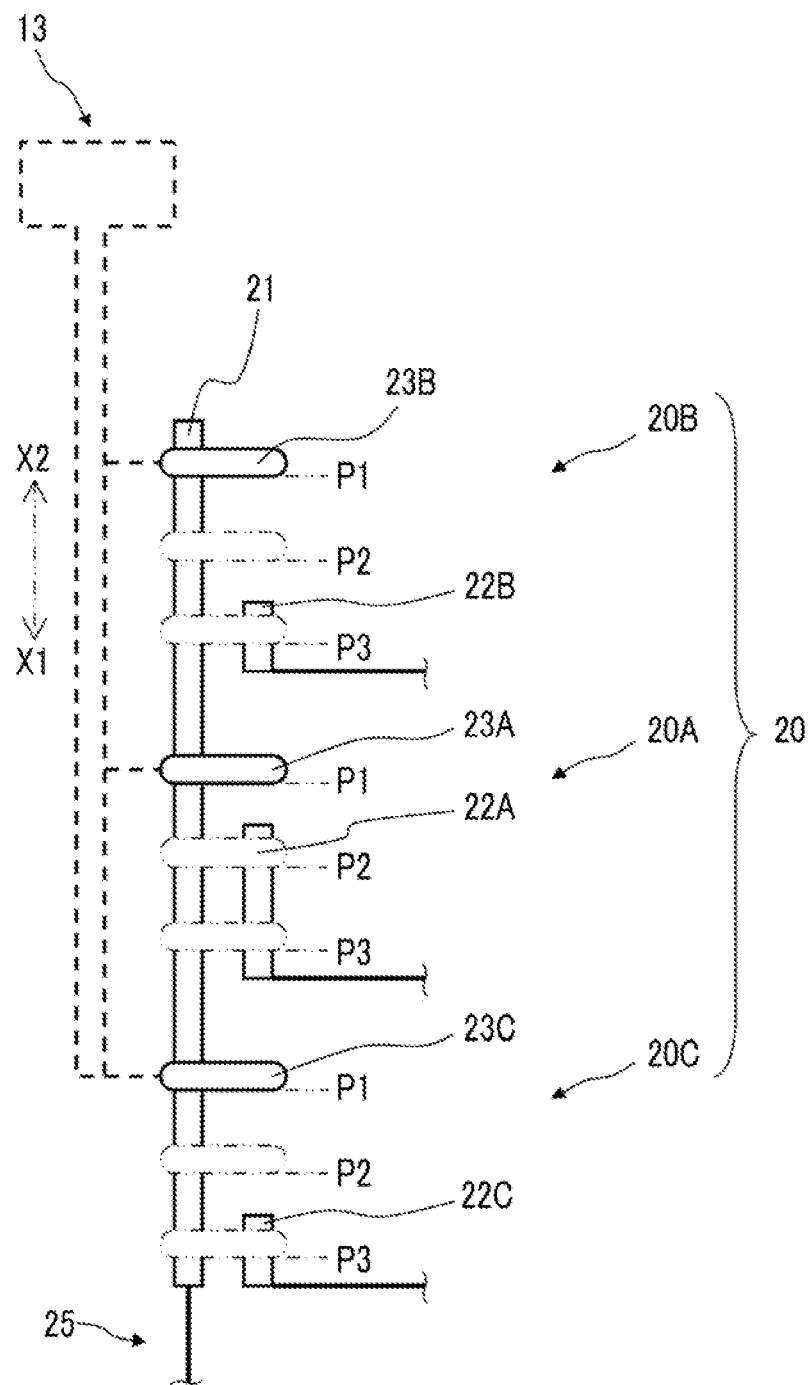
FIG. 12 is an explanatory view showing an operation unit in a third modification of the first embodiment of the present invention.

FIG. 12 is an explanatory view showing an operation unit 13 in the third modification. The operation unit 13 has a fixed terminal 21 as a common terminal. Therefore, it is possible to realize a shape that is long in the X1-X2 direction and is short in a direction perpendicular to the X1-X2 direction.

(4) In the present embodiment, two or three contact circuits 20 have been described in detail. However, a larger number of contact circuits 20 may be provided.

(5) In the present embodiment, the contact circuit 20 has been described as a normally open switch. However, the normally closed contact circuits 20 may also be used. In this case, the initial state is a closed state between the fixed contacts, and the ON state is an open state between the fixed contacts.

(6) In the present embodiment, the fixed terminals 21 and 22 have been described as conductive metal plates. However, the fixed terminals 21 and 22 may be conductive patterns that are printed or plated on an insulating substrate.

Second Embodiment

Figure 16:
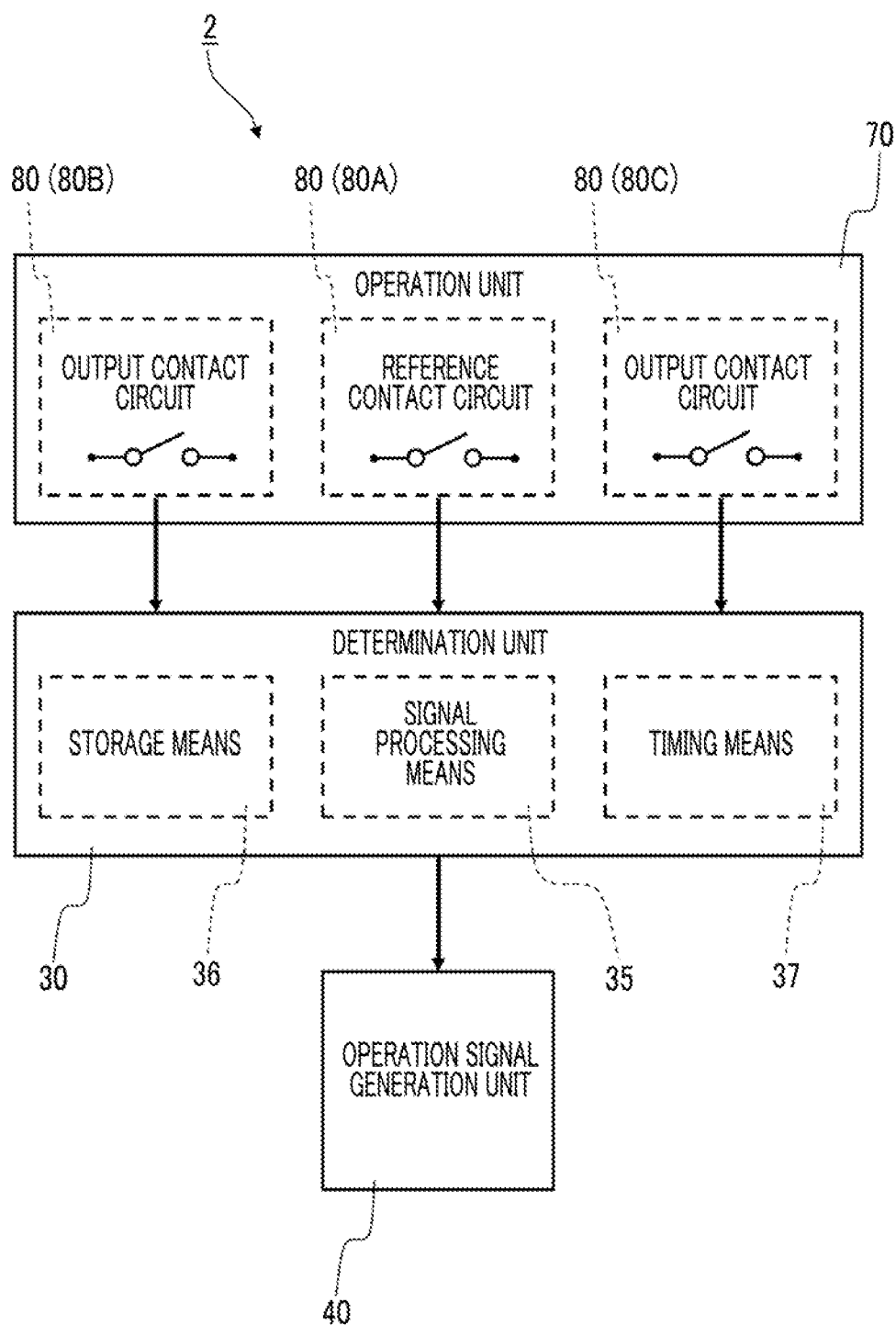
FIG. 16 is a block diagram showing an operation device according to a second embodiment of the present invention.
Figure 17:
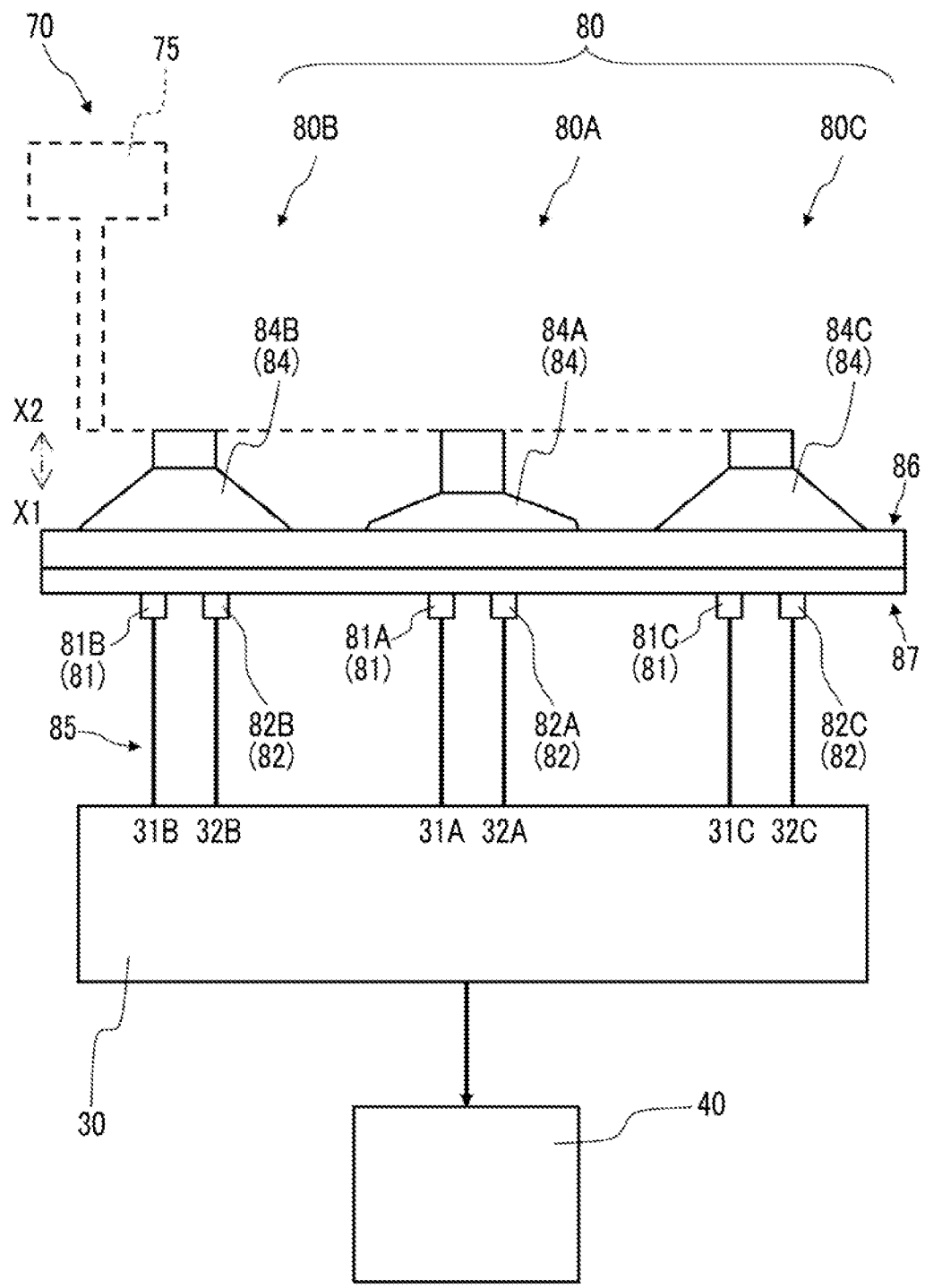
FIG. 17 is an explanatory view showing an operation unit shown in FIG. 16.
Figure 18:
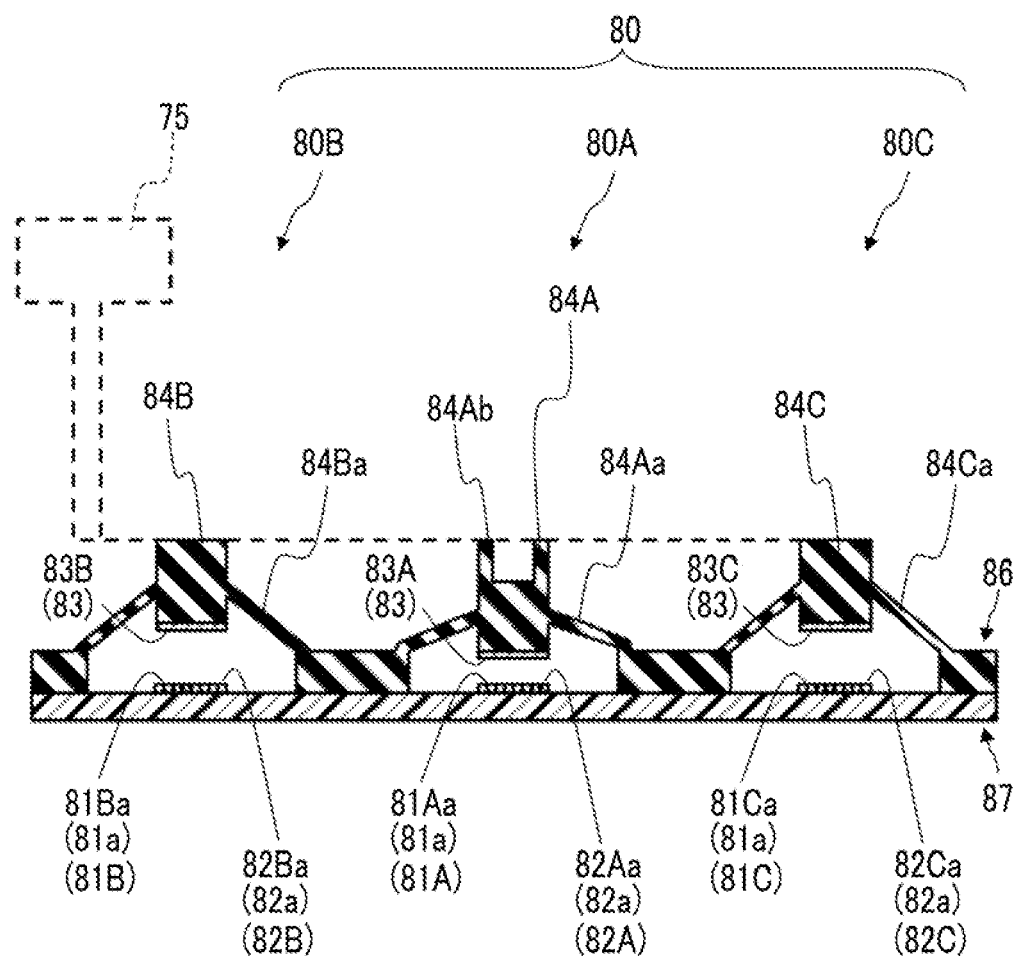
FIG. 18 is an explanatory view showing a contact circuit in cross-sectional view.
Figure 19A:
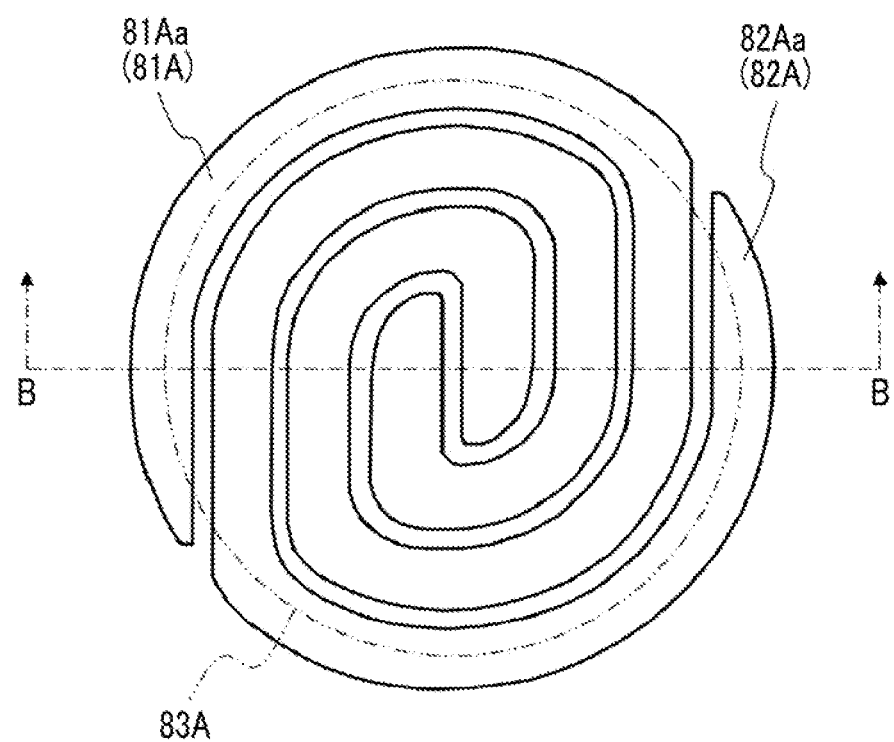
FIGS. 19A and 19B are explanatory views showing a fixed electrode, where
Figure 19B:
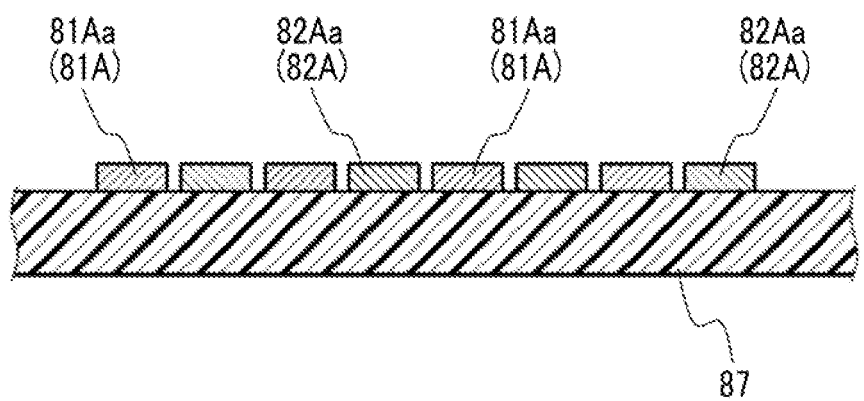
Figure 22:
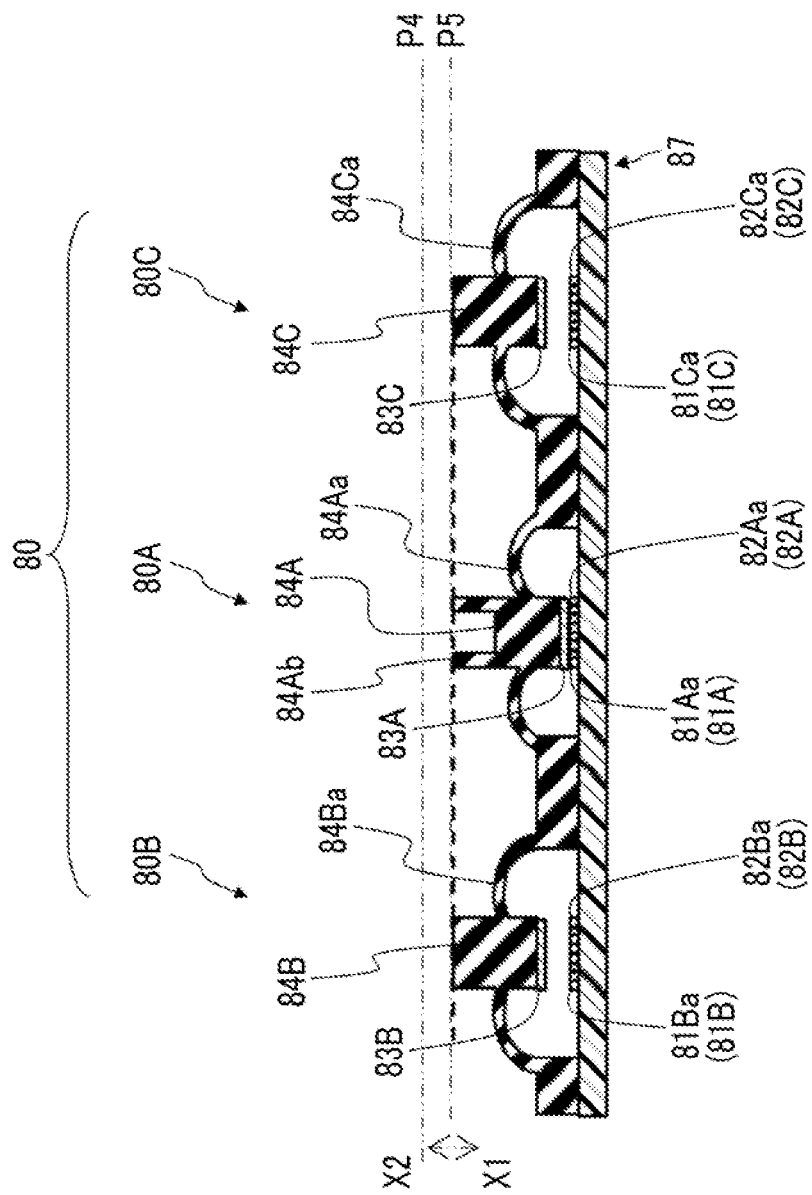
FIG. 22 is an explanatory view showing a state in which the contact circuit shown in FIG. 18 is located at a position of a transient state.
Figure 23:
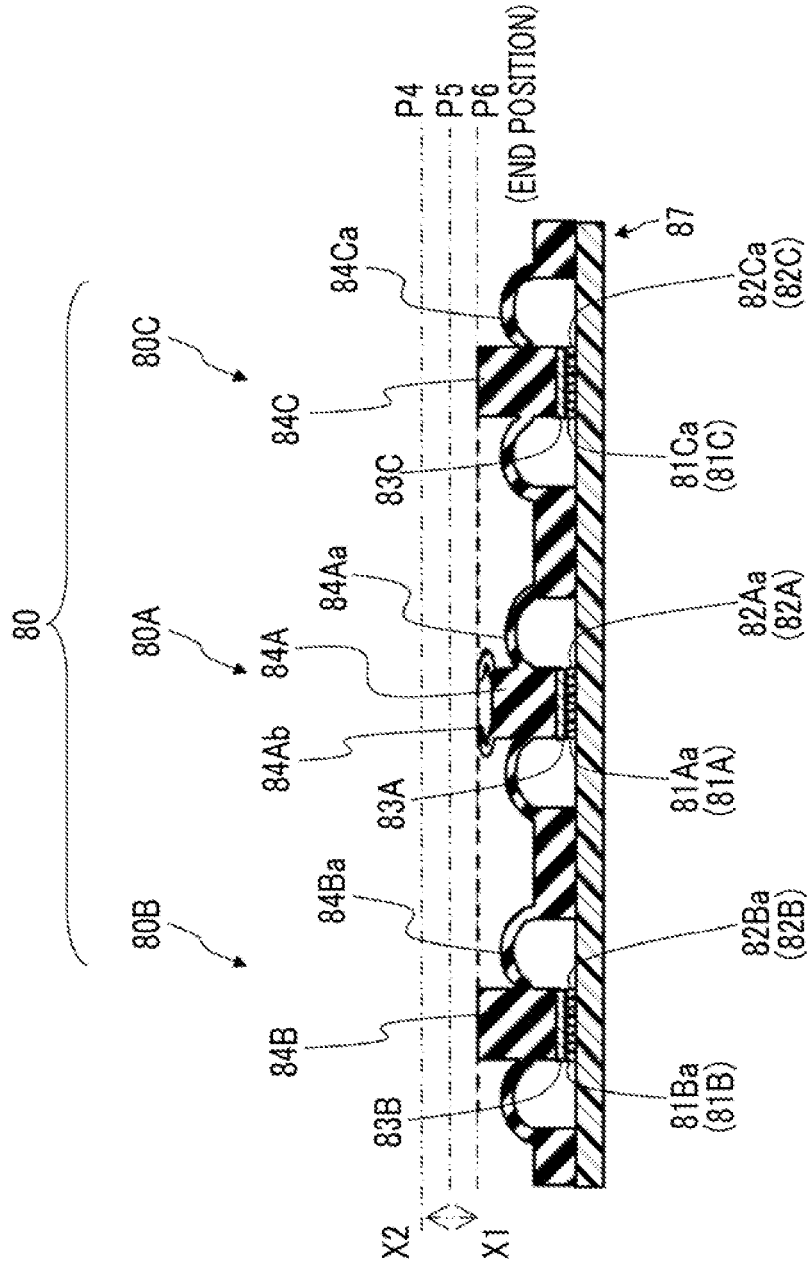
FIG. 23 is an explanatory view showing a state in which the contact circuit shown in FIG. 18 is located at an end position.
Figure 26:
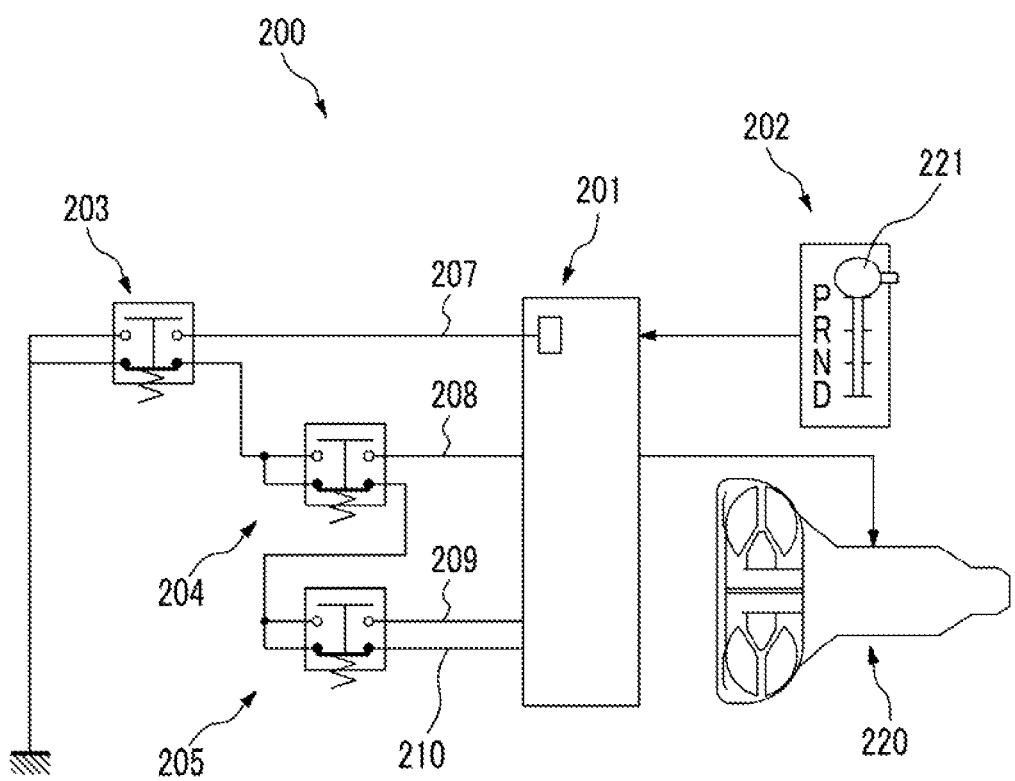
FIG. 26 is a schematic diagram of a control device of an automatic transmission with a manual mode in the related art.

FIG. 16 is a block diagram showing an operation device 2 according to a second embodiment of the present invention. FIG. 17 is an explanatory view showing an operation unit 70 shown in FIG. 16. FIG. 18 is an explanatory view showing a contact circuit 80 in cross-sectional view. FIGS. 19A and 19B are explanatory views showing fixed electrodes 81Aa and 82Aa, where FIG. 19A shows fixed electrodes in plan view and FIG. 19B is a cross-sectional view taken along the line B-B of FIG. 19A. FIG. 20 is an explanatory view when the operation device 2 according to the second embodiment is applied to a vehicle transmission 61. FIG. 21 is an explanatory view showing a state in which the contact circuit 80 shown in FIG. 18 is located at an initial position P4. FIG. 22 is an explanatory view showing a state in which the contact circuit 80 shown in FIG. 18 is located at a position P5 of a transient state. FIG. 23 is an explanatory view showing a state in which the contact circuit 80 shown in FIG. 18 is located at an end position P6. In addition, since the second embodiment is the same as the first embodiment except that the configuration of the operation unit 70 is different from that of the operation unit 10 of the operation device 1 according to the first embodiment, the same reference numerals are used.

As shown in FIG. 16, the operation device 2 according to the present embodiment includes the operation unit 70, a determination unit 30, and an operation signal generation unit 40. The operation unit 70 for performing an input operation includes a plurality of contact circuits 80. In FIG. 16, as the contact circuit 80, output contact circuits 80B and 80C and a reference contact circuit 80A are provided. The determination unit 30 includes signal processing means 35, storage means 36, and timing means 37, and determines that the operation unit 70 is in a state of ON operation or in a state of non-operation based on the ON state or OFF state of each contact circuit 80. The operation signal generation unit 40 outputs a signal indicating that the operation unit 70 is in a state of ON operation based on the determination result of the determination unit 30.

As shown in FIG. 17, the operation unit 70 includes an operation member 75, which is operated for input, and the reference contact circuit 80A and the output contact circuits 80B and 80C as the contact circuit 80 that is formed by a switch unit mechanically connected to the operation member 75. The reference contact circuit 80A and the output contact circuits 80B and 80C include elastic members 84A, 84B, and 84C disposed corresponding to fixed terminals 81A, 82A, 81B, 82B, 81C, and 82C, respectively. The fixed terminals 81A, 82A, 81B, 82B, 81C, and 82C are connected to conductors 85, and are electrically connected to connection terminals 31A, 32A, 31B, 32B, 31C, and 32C provided in the determination unit 30, respectively. The elastic members 84A, 84B, and 84C are formed by a rubber sheet 86 of synthetic rubber, and are configured so as to bend in the X1-X2 direction by the input operation of the operation member 75. In addition, the input operation direction of the operation member 75 is not limited to the X1-X2 direction, and it is also possible to change the direction through a direction conversion mechanism.

The reference contact circuit 80A and the output contact circuits 80B and 80C include the elastic members 84A, 84B, and 84C. In cross-sectional view, as shown in FIG. 18, movable electrodes 83A, 83B, and 83C that are movable contacts are provided in hollow portions of the elastic members 84A, 84B, and 84C. In addition, fixed electrodes 81Aa, 82Aa, 81Ba, 82Ba, 81Ca, and 82Ca that are formed in the fixed terminals 81A, 82A, 81B, 82B, 81C, and 82C so as to correspond to the movable electrodes 83A, 83B, and 83C are provided on an insulating substrate 87. A set of fixed electrodes 81Aa and 82Aa have a conductive pattern in plan view as shown in FIG. 19, for example, and are disposed so as to be electrically separated from each other. The same is true for the fixed electrodes 81Ba and 82Ba and for the fixed electrodes 81Ca and 82Ca. In addition, a set of fixed electrodes 81Aa and 82Aa are electrically connected to each other through the movable electrode 83A when the movable electrode 83A comes in contact with the fixed electrodes 81Aa and 82Aa, which will be described later. The same is true for the fixed electrodes 81Ba and 82Ba and for the fixed electrodes 81Ca and 82Ca. Here, as shown in FIG. 21, at the initial position P4, the respective movable electrodes are formed in different contact heights so that the contact height of the movable electrode 83A is lower than that of the movable electrodes 83B and 83C. Therefore, at the initial position P4, a height-direction distance between the movable electrode 83A and the fixed electrode 81Aa (82Aa) in the reference contact circuit 80A is smaller than a height-direction distance between the movable electrode 83B and the fixed electrode 81Ba (82Ba) in the output contact circuit 80B. Similarly, at the initial position P4, the height-direction distance between the movable electrode 83A and the fixed electrode 81Aa (82Aa) is smaller than a height-direction distance between the movable electrode 83C and the fixed electrode 81Ca (82Ca) in the output contact circuit 80C.

The elastic members 84A, 84B, and 84C are flexible due to thin dome portions 84Aa, 84Ba, and 84Ca, but the initial state shown in FIG. 18 is maintained by the restoring force of the material itself of the elastic member 84. In addition, as shown in FIG. 18, the elastic member 84A also includes an elastically deformable portion 84Ab immediately above the dome portion 84Aa. The elastic members 84A, 84B, and 84C can elastically deform independently of one another, and are configured so as to bend in conjunction with each other in the X1-X2 direction through the operation member 75. When the elastic member 84A is pressed by the operation member 75, the dome portion 84Aa is bent to be inverted toward the insulating substrate 87. As a result, the movable electrode 83A comes in contact with the fixed electrode 81Aa and 82Aa, and electrically stable connection is possible. In addition, when the elastic member 84B is pressed by the operation member 75, the dome portion 84Ba is bent to be inverted toward the insulating substrate 87. As a result, the movable electrode 83B comes in contact with the fixed electrode 81Ba and 82Ba, and electrically stable connection is possible. In addition, when the elastic member 84C is pressed by the operation member 75, the dome portion 84Ca is bent to be inverted toward the insulating substrate 87. As a result, the movable electrode 83C comes in contact with the fixed electrode 81Ca and 82Ca, and electrically stable connection is possible.

As shown in FIG. 20, the operation device 2 according to the present embodiment is for operating the vehicle transmission 61. As the operation unit 70 for operating the vehicle transmission 61 mounted in a vehicle 60, for example, a drive (D) button 51, a neutral (N) button 52, a reverse (R) button 53, and a park (P) button 54 are disposed, and a plurality of contact circuits 80 shown in FIG. 17 are provided in the respective buttons. The six conductors 85 shown in FIG. 17 are connected to the plurality of operation units 70 (the D button 51, the N button 52, the R button 53, and the P button 54). The plurality of operation units 70 are connected to the common determination unit 30 through the conductors 85. The determination unit 30 determines that any one of the D button 51, the N button 52, the R button 53, and the P button 54 is in a state of ON operation, and the operation signal generation unit 40 outputs a signal indicating that the D button 51, the N button 52, the R button 53, or the P button 54 is in a state of ON operation based on the determination result of the determination unit 30. The vehicle transmission 61 shifts gears when receiving one of the operation signals. In addition, the operation signal generation unit 40 and the vehicle transmission 61 are connected to each other through an in-vehicle network. For example, a controller area network (CAN) is used.

In operation of the vehicle transmission 61, if a signal indicating the state of ON operation is erroneously output even though the vehicle transmission 61 is not being operated, a possibility that the driving of the vehicle 60 will be dangerous is high. Therefore, in the past, a plurality of contact circuits are provided and a signal indicating the state of ON operation is output when the plurality of contact circuits are turned on simultaneously, thereby reducing the possibility of erroneous output. In addition, a failure mode in which no signal indicating the state of ON operation is output even though the ON operation is being performed is generally considered to be less dangerous for driving of the vehicle. In this case, if any one of the plurality of contact circuits is in an OFF state, "no ON-operation state" may be determined. In addition, if the OFF state of other contact circuits continues when any one of the contact circuits is in an ON state, it may be determined that failure of the short-circuit mode or failure of the disconnection mode has occurred, and an alarm or the like may be displayed. Thus, there has been a problem of erroneous failure detection that an alarm or the like is displayed if an operation state, such as half-pressing an operation button, continues even if there is no problem in contact circuits.

Since the operation device 2 according to the present embodiment has the features described below, it is possible to reduce the possibility of erroneous failure detection compared with the related art.

As shown in FIGS. 17 and 21, in the contact circuit 80 of the present embodiment, the elastic members 84A, 84B, and 84C are aligned in a direction perpendicular to the X1-X2 direction in which the elastic members 84A, 84B, and 84C bend. At the initial position P4 in a normal state where there is no failure of the short-circuit mode, the movable electrodes 83A, 83B, and 83C are spaced apart from the fixed electrode 81Aa, 82Aa, 81Ba, 82Ba, 81Ca, and 82Ca. Therefore, all of the contact circuits 80 of the reference contact circuit 80A and the output contact circuits 80B and 80C are turned off.

As shown in FIG. 22, when the elastic members 84A, 84B, and 84C bend to be located at the position P5 in the middle of operation, the movable electrode 83A that is a movable contact and the fixed electrodes 81Aa and 82Aa come in contact with each other in the reference contact circuit 80A, resulting in an ON state where the fixed electrodes 81A and 82A are electrically connected to each other. In this case, in the elastic member 84A, the elastically deformable portion 84Ab hardly deforms, but the dome portion 84Aa bends. On the other hand, in the elastic member 84B, the dome portion 84Ba bends. However, due to the difference between the contact heights of the movable electrodes 83A and 83B described above, the movable electrode 83B that is a movable contact is not in contact with the fixed electrodes 81Ba and 82Ba at the position P5 in FIG. 22. Similarly, in the elastic member 84C, the dome portion 84Ca bends. However, due to the difference between the contact heights of the movable electrodes 83A and 83C described above, the movable electrode 83C that is a movable contact is not in contact with the fixed electrodes 81Ca and 82Ca at the position P5. Thus, since the reference contact circuit 80A is provided with the distance from the initial position P4 to the position P5, at which the reference contact circuit 80A is turned on, shorter than that in the output contact circuits 80B and 80C, the reference contact circuit 80A is turned on earlier than the output contact circuits 80B and 80C. In addition, it is preferable that the dome portion 84Aa of the elastic member 84A be formed in a thickness in which the dome portion 84Aa bends easily compared with the dome portion 84Ba and 84Ca. In addition, the elastically deformable portion 84Ab of the elastic member 84A has a structure where the elastically deformable portion 84Ab is difficult to bend compared with the dome portion 84Ba and 84Ca.

In general, in the contact circuit configured to include a fixed contact and a movable contact provided in the elastic member, it is not possible to reduce to zero the influence of rattling with respect to the bending of the elastic member. For this reason, even if three movable contacts are aligned in a direction perpendicular to the X1-X2 direction in which the movable contacts move, a timing at which each circuit is turned on cannot be fixed due to the influence of rattling with respect to the movement of the movable contacts. In the present embodiment, however, the reference contact circuit 80A is necessarily turned on earlier than the output contact circuits 80B and 80C.

When the reference contact circuit 80A is located at the approximate center position between the two or more output contact circuits 80B and 80C, the influence of rattling with respect to the movement of the movable contact is the smallest. In this case, the reference contact circuit 80A can be stably turned on at a timing earlier than the other contact circuits.

By further bending of the elastic members 84A, 84B, and 84C, as shown in FIG. 23, all of the contact circuits 80 are moved to the end position P6 where the contact circuits 80 are turned on. That is, in the output contact circuit 80B, the movable electrode 83B that is a movable contact and the fixed electrode 81Ba and 82Ba come in contact with each other, resulting in an ON state where the fixed electrodes 81B and 82B are electrically connected to each other. In the output contact circuit 80C, the movable electrode 83C that is a movable contact and the fixed electrode 81Ca and 82Ca come in contact with each other, resulting in an ON state where the fixed electrodes 81C and 82C are electrically connected to each other. In this case, in the elastic member 84A, the elastically deformable portion 84Ab bends in addition to the bending of the dome portion 84Aa. Therefore, since it is possible to realize movement to the end position P6 by the elastically deformable portion 84Ab, which is not possible by the movable electrode 83A, the reference contact circuit 80A continues an ON state even at the end position P6. In a normal state where there is no failure of the disconnection mode, all of the plurality of contact circuits 80 of the reference contact circuit 80A and the output contact circuits 80B and 80C are turned on.

In the present embodiment, since the three contact circuits 80 are provided, it is possible to determine that the operation unit 70 is in a state of ON operation or in a state of non-operation by majority when only one contact circuit is turned on or off in a different manner from the other two contact circuits. In addition, this state occurs not only when one of the three contact circuits has failed but also in a transient state (refer to FIG. 22) that is an intermediate operation state before all of the contact circuits 80 are turned on from the OFF state. Therefore, it is preferable to perform failure determination in consideration of the duration. In addition, if no abnormality occurs in the two remaining contact circuits even after the failure of one contact circuit has been determined, it is preferable to enable the same operation as in the normal situation since the states of the two remaining contact circuits are the same as the ON state or the OFF state.

Next, the features of the determination unit 30 in the present embodiment will be described. FIG. 24 is an explanatory view showing an output of the operation device 2 according to the present embodiment. FIG. 25 is an explanatory view showing an output when the number of contact circuits 80 is two.

As shown in FIG. 17, the determination unit 30 in the present embodiment includes the connection terminals 31A, 32A, 31B, 32B, 31C, and 32C electrically connected to the contact circuit 80. In addition, as shown in FIG. 16, the determination unit 30 includes the signal processing means 35 for signal processing with respect to the state of the contact circuit 80, the storage means 36 for storing the processing content of the signal processing means 35, and the timing means 37.

The signal processing means 35 in the present embodiment determines that the operation unit 70 is in a state of ON operation or in a state of non-operation based on the ON state or OFF state of each of the reference contact circuit 80A and the output contact circuits 80B and 80C connected to the connected terminals 31A, 32A, 31B, 32B, 31C, and 32C. According to each state, a determination result shown in FIG. 24 is output from the operation signal generation unit 40. In FIG. 24, an OFF state is expressed as "0", and an ON state is expressed as "1".

The operation device 2 according to the present embodiment includes the reference contact circuit 80A and the output contact circuits 80B and 80C as the contact circuit 80. As shown in FIG. 24, in the operation device 2 according to the present embodiment, in a transient state in the middle of operation in which the reference contact circuit 80A is located at the position P5 to end position P6, the reference contact circuit 80A is always in an ON state. In addition, since an odd number of circuits are provided as the contact circuits 80 in the present embodiment, a state of ON operation or a state of non-operation can be determined by a majority of an odd number of circuits. The case of remark a corresponds to either a normal transient state or short-circuit failure of the reference contact circuit 80A. The case of remark b corresponds to any one of a normal transient state, a short-circuit failure of the output contact circuit 80B, and a short-circuit failure of the output contact circuit 80C. The case of remark c corresponds to any one of a normal transient state, a disconnection failure of the output contact circuit 80B, and a disconnection failure of the output contact circuit 80C, and an alarm or the like can be displayed. In the cases of remarks a, b, and c, an alarm or the like is displayed even in a normal transient state. Therefore, erroneous failure detection is avoided by the measurement of elapsed time or the like. In addition, if at least one of the output contact circuits 80B and 80C is in an ON state and the reference contact circuit 80A is in an OFF state, one contact circuit is necessarily defective. The case of remark d corresponds to either disconnection failure of the reference contact circuit 80A or short-circuit failure of the output contact circuit 80C, and an alarm or the like can be displayed. The case of remark e corresponds to either disconnection failure of the reference contact circuit 80A or short-circuit failure of the output contact circuit 80B, and an alarm or the like can be displayed. In the case of remark f, disconnection failure of the reference contact circuit 80A is determined, and an alarm or the like can be displayed.

By adopting the present embodiment, it is possible to generate an output from the operation signal generation unit 40 by the switch input and to improve the accuracy of failure detection when the contact of one location fails. Therefore, it is clear that safety can be increased by determining a failure more reliably.

In addition, the reason why the state of ON operation or the state of non-operation is determined by a majority of three contact circuits is that there is almost no possibility that two contact circuits will fail simultaneously. For example, when an electrical circuit fails due to submergence or the like, three contact circuits fail simultaneously. However, when contact failure occurs due to foreign material or the like, a possibility that the foreign material will influence two contact circuits is very low. In addition, after the failure of one contact circuit has been determined, determination can be performed by using the two remaining contact circuits until a second failure occurs. The operation device 2 according to the present embodiment is for operating the vehicle transmission 61. Accordingly, even when the failure of the contact circuit 80 is detected during the driving, the vehicle transmission 61 can be continuously operated without falling into the state where the vehicle transmission 61 cannot be operated suddenly. As a result, the driver can move the vehicle 60 to a safer place.

The operation device 2 according to the present embodiment includes the storage means 36. Therefore, when the failure of one contact circuit has been determined, the content of failure determination can be stored, and subsequent determination can be performed by using two contact circuits that have not failed. In addition, the operation device 1 according to the present embodiment includes the timing means 37. Therefore, by measuring the elapsed time in each state shown in FIG. 24, it is possible to perform determination or display an alarm or the like when there is no change in the state after the elapsed time set in advance. After the failure of one contact circuit has been determined, a state of ON operation or a state of non-operation cannot be determined by a majority of three contact circuits. However, since the other two contact circuits are normal, it is possible to reduce erroneous failure detection by performing the determination by combining the timing means 37 with the other two contact circuits.

In addition, when the operation device 2 according to the present embodiment is for operating the vehicle transmission 61, it is preferable to perform determination regarding subsequent operations after determining that all of three contact circuits are in an OFF state, immediately after the determination unit 30 starts the operation (immediately after electric power is supplied). In this manner, it is possible to avoid a problem, such as sudden acceleration immediately after the operation start due to erroneous operation of the operation member 75. In addition, after the failure of one contact circuit has been determined, the condition is changed to determination that the two remaining contact circuits are in an OFF state.

In the operation device 2 according to the present embodiment, even if one reference contact circuit 80A and one output contact circuit 80B are provided, there is an effect that is different from the case where there is no reference contact circuit and only two output contact circuits are provided. In FIG. 25, an OFF state is expressed as "0", and an ON state is expressed as "1".

As shown in FIG. 25, also when one reference contact circuit 80A and one output contact circuit 80B are provided, the reference contact circuit 80A should always be in an ON state in a transient state in the middle of operation in which the reference contact circuit 80A is located at the position P5 to end position P6. In the case of remark g, a normal transient state, short-circuit failure of the reference contact circuit 80A, or disconnection failure of the output contact circuit 80B cannot be determined. However, in the case of remark h, the failure is either disconnection failure of the reference contact circuit 80A or short-circuit failure of the output contact circuit 80B. Therefore, since it is possible to improve the accuracy of failure detection when the contact of one location fails, it is possible to increase safety by determining a failure more reliably. In the operation device 1 according to the present embodiment, even after the failure of one of the two output contact circuits 80B and 80C has been determined, it is possible to generate an output from the operation signal generation unit 40 by the switch input and to improve the accuracy of failure detection when the contact of one location fails. Therefore, it is possible to increase safety by determining a failure more reliably.

Hereinafter, the effect of the present embodiment will be described.

The operation device 2 according to the present embodiment includes an operation unit 70 for performing an input operation. The operation unit 70 includes contact circuits 80 including a plurality of fixed terminals 81 and 82 discretely arranged and the movable electrode 83 that is a movable contact for selectively changing a state between the fixed terminals 81 and 82 to an ON state or an OFF state. When the operation unit 70 is in a non-operation state, the movable contact is at the initial position P4 where all of the plurality of contact circuits 80 are in an OFF state. In response to an ON operation performed on the operation unit 70, the contact circuits 80 move in conjunction with each other from the initial position P4 to the end position P6 where all of the contact circuits 80 are turned on. In addition, the operation device 1 according to the present embodiment includes the determination unit 30 to which the contact circuits 80 are connected and configured to determine that the operation unit 70 is in a state of ON operation or in a state of non-operation based on an ON state or an OFF state of each of the contact circuits 80 and the operation signal generation unit 40 configured to output a signal indicating that the operation unit 70 is in a state of the ON operation based on a determination result of the determination unit 30. In addition, one of the plurality of contact circuits 80 is set as the reference contact circuit 80A and the others are set as the output contact circuits 80B, and the reference contact circuit 80A is provided with the distance from the initial position P4 to the position P5, at which the reference contact circuit 80A is turned on, shorter than that in the output contact circuit 80B.

According to this configuration, at the time of ON operation, the reference contact circuit 80A is turned on at a timing earlier than the other output contact circuits 80B. In this case, it is possible to output a signal indicating the state of ON operation when the reference contact circuit 80A is in a state of ON operation and the other output contact circuits 80B are in an ON state. When the reference contact circuit 80A is in an OFF state and any one of the other output contact circuits 80B is in an ON state, it is possible to determine that either the reference contact circuit 80A or any one of the output contact circuits 80B in an ON state has certainly failed and to display an alarm or the like. Therefore, since it is possible to improve the accuracy of failure detection when the contact of one location fails, it is possible to increase safety by determining a failure more reliably.

In addition, in the operation device 2 according to the present embodiment, the contact circuit 80 includes one reference contact circuit 80A and two or more output contact circuits 80B and 80C. The determination unit 30 determines that the operation unit 70 is in the ON operation state or in the non-operation state based on the ON state or the OFF state of each of the contact circuits 80. According to this configuration, three or more contact circuits 80 are provided, and it is possible to determine that the operation unit 70 is in a state of ON operation based on the state of each of the three or more contact circuits 80 and to output a signal indicating that the operation unit 10 is in a state of ON operation. In this case, even if any one of the contact circuits 80 fails, it is possible to continue the operation by determining the state of ON operation using the two or more remaining contact circuits 80. Therefore, it is not necessary to stop the output immediately only due to the failure of one contact circuit 80.

In addition, in the operation device 2 according to the aspect of the present embodiment, an odd number of three or more contact circuits 80 are provided, and the determination unit 30 determines that the operation unit 70 is in the ON operation state or in the non-operation state by a majority of the odd number of contact circuits 80 based on the ON state or the OFF state of each of the contact circuits 80. According to this configuration, an odd number of three or more contact circuits 80 are provided, and it is possible to determine that the operation unit 70 is in a state of ON operation by a majority of the odd number of three or more contact circuits 80 based on the ON state or the OFF state of each of the odd number of three or more contact circuits 80 and to output a signal indicating that the operation unit 70 is in a state of ON operation. Since the determination is performed based on the state of each of the three or more contact circuits 80, it is possible to specify the contact circuit 80 that has failed first. In addition, since it is determined that the operation unit 70 is in a state of ON operation or in a state of non-operation using the remaining contact circuits 80 even if one contact circuit 80 fails, there is no problem in the operation of the operation device 2.

In addition, in the operation device 2 according to the present embodiment, the reference contact circuit 80A is disposed at a position between the output contact circuits 80B and 80C in a direction perpendicular to a direction of movement from the initial position P4 to the end position P6. According to this configuration, when the reference contact circuit 80A is located at the approximate center position between the two or more output contact circuits 80B and 80C, the influence of rattling with respect to the movement of the movable contact is the smallest. In this case, the reference contact circuit 80A can be stably turned on at a timing earlier than the other contact circuits.

In addition, in the operation device 2 of the present invention, each of the plurality of contact circuits 80 includes the fixed electrodes 81a and 82a formed in the plurality of fixed terminals 81 and 82, and the movable electrode 83 that is a movable contact is a switch unit that can come in elastic contact with the plurality of fixed electrodes 81a and 82a. According to this configuration, it becomes easy to manufacture the operation device 2 by using a switch unit, which includes the fixed electrodes 81a and 82a and the movable electrode 83 that is a movable contact, for the plurality of contact circuits 80.

The operation device 2 according to the present embodiment is for operating the vehicle transmission 61. By using the operation device for the operation of the vehicle transmission 61, it is possible to perform more reliable gear shifting.

While the operation device 2 according to the second embodiment of the present invention has been specifically described above, the invention is not limited to the embodiment described above, and various changes may be made without departing from the scope of the present invention. For example, the following modifications can be implemented, and these also belong to the technical range of the present invention.

(1) In the present embodiment, two of the three contact circuits 80 are set as the output contact circuits 80B and 80C so as to have the same distance from the initial position P4 to the position P6 where the contact circuits 80 are turned on. However, the output contact circuit 80C may be changed to a switch unit having a larger distance. In this case, the failure of one contact circuit and the normal transient state can be more clearly determined. In addition, the state of ON operation or the state of non-operation can be determined by a majority of three contact circuits.

(2) In the present embodiment, due to the difference between the contact heights of the movable electrodes 83A, 83B, and 83C, the reference contact circuit 80A is provided with the distance from the initial position, at which the movable electrode 83A that is a movable contact starts to move, to a position where the movable electrode 83A is turned on, shorter than that in the output contact circuits 80B and 80C. However, the fixed electrode 81Aa and 82Aa may be formed so as to be higher than the fixed electrode 81Ba, 82Ba, 81Ca, and 82Ca.

(3) In the present embodiment, the movable electrodes 83A, 83B, and 83C are formed in the elastic members 84A, 84B, and 84C provided in the rubber sheet 86. However, it is also possible to form a movable contact in a metal spring, such as a flat spring.

(4) In the present embodiment, two or three contact circuits 80 have been described in detail. However, it is also possible to adopt a configuration including four or more contact circuits 80.

It should be understood by those skilled in the art that various modifications, combinations, sub-combinations and alterations may occur depending on design requirements and other factors insofar as they are within the scope of the appended claims of the equivalents thereof.

What is claimed is:

1. An operation device, comprising:
   an operation unit configured to perform an input operation, the operation unit including a plurality of contact circuits each having:
      first and second fixed terminals separated from each other; and
      a movable contact configured to selectively connect between the first and second fixed terminals by moving from an initial position to an end position thereof to provide an ON state or an OFF state of the contact circuit, the movable contact in the initial position providing the OFF state and the movable contact in the end position providing the ON state;
   a determination unit connected to each of the plurality of contact circuits, the determination unit determining if the operation unit is in an ON operation state or in a non-operation state based on the ON state or the OFF state of each of the plurality of contact circuits, all of the plurality of contact circuits being in the OFF state with the respective movable contacts at the initial position when the operation unit is in the non-operation state; and
   an operation signal generation unit configured to output a signal indicating that the operation unit is in the ON operation state based on a determination result of the determination unit,
   wherein in response to an ON operation performed on the operation unit, the movable contacts in the plurality of contact circuits move together from the respective initial position to the respective end position such that all of the plurality of contact circuits turn into the ON state, and
   wherein the plurality of contact circuits include a reference contact circuit and the remaining output contact circuits, a distance between the initial position and a position where the movable contact comes into contact with the second fixed terminal in the reference contact circuit is smaller than that in the output contact circuits.

2. The operation device according to claim 1,
   wherein the plurality of contact circuits include only one reference contact circuit and two or more output contact circuits.

3. The operation device according to claim 2, wherein the operation unit includes an odd number of the contact circuits, and
   the determination unit determines that the operation unit is in the ON operation state or in the non-operation state if a majority of the odd number of the contact circuits are in the ON state or the OFF state.

4. The operation device according to claim 2,
   wherein the reference contact circuit is disposed at a position between the two or more output contact circuits in a direction perpendicular to a direction in which the movable contact moves from the initial position to the end position.

5. The operation device according to claim 1,
   wherein the movable contact is a slider in sliding contact with the first fixed terminal.

6. The operation device according to claim 1, wherein each of the plurality of contact circuits is a switch unit in which:
   the first and second fixed terminals are first and second fixed electrodes electrically separated from each other, and
   the movable contact is a movable electrode configured to switchable come into contact with the first and second fixed electrodes to provide an electrical connection therebetween.

7. The operation device according to claim 1,
   wherein the operation device is configured to operate a vehicle transmission.

8. The operation device according to claim 1, wherein the reference contact circuit turns into the ON state before the output contact circuits turn into the ON state when the ON operation is performed on the operation unit.

9. The operation device according to claim 1, wherein the first fixed terminals of the plurality of contact circuits are formed as a common terminal.

10. The operation device according to claim 6, wherein the switch unit further includes an elastic member configured to movably support the movable electrode.

* * * * *